United States Patent
Richards

(10) Patent No.: US 12,360,926 B2
(45) Date of Patent: Jul. 15, 2025

(54) BUFFERING ELEMENTS FOR PROCESSING

(71) Applicant: TRADING TECHNOLOGIES INTERNATIONAL, INC., Chicago, IL (US)

(72) Inventor: Jeffrey S. Richards, Aurora, IL (US)

(73) Assignee: Trading Technologies International, Inc., Chicago, IL (US)

(*) Notice: Subject to any disclaimer, the term of this patent is extended or adjusted under 35 U.S.C. 154(b) by 128 days.

(21) Appl. No.: 18/084,276

(22) Filed: Dec. 19, 2022

(65) Prior Publication Data
US 2024/0202143 A1    Jun. 20, 2024

(51) Int. Cl.
*G06F 13/16* (2006.01)

(52) U.S. Cl.
CPC ...... *G06F 13/1673* (2013.01); *G06F 2213/16* (2013.01)

(58) Field of Classification Search
CPC ... G06F 13/1673; G06F 9/544; G06F 2213/16
See application file for complete search history.

(56) References Cited

U.S. PATENT DOCUMENTS

| | | | |
|---|---|---|---|
| 2005/0018609 A1* | 1/2005 | Dally | H04L 49/90 370/235 |
| 2011/0040906 A1* | 2/2011 | Chung | G06F 12/121 711/E12.001 |
| 2012/0016786 A1* | 1/2012 | Mintz | G06Q 40/06 705/37 |
| 2012/0215997 A1* | 8/2012 | Stanfill | G06F 9/544 711/158 |
| 2015/0249708 A1* | 9/2015 | Feinberg | H04L 67/1097 709/217 |
| 2017/0005953 A1* | 1/2017 | Bracha | H04L 49/9084 |
| 2021/0409998 A1* | 12/2021 | Kwok | H04L 45/302 |
| 2022/0365815 A1* | 11/2022 | Ma | G06F 9/5022 |
| 2023/0010161 A1* | 1/2023 | Pardo | H04L 49/9036 |

OTHER PUBLICATIONS

International Search Report and Written Opinion for International Application No. PCT/US2023/084568, mailed Apr. 18, 2024.

\* cited by examiner

*Primary Examiner* — Phong H Dang
(74) *Attorney, Agent, or Firm* — MCDONNELL BOEHNEN HULBERT & BERGHOFF LLP

(57) ABSTRACT

Techniques relating to buffers are disclosed. A first buffer may be for storing a number of elements for processing. Disclosed techniques include providing a second buffer for storing elements for adding to the first buffer, and adding an obtained element to the second buffer when the number of elements in the first buffer is greater than a first threshold. These techniques can prevent overrun of the first buffer while allowing the obtained element to be added to a buffer.

18 Claims, 9 Drawing Sheets

BUFFERING ELEMENTS FOR PROCESSING

BACKGROUND

In computing, a buffer is commonly understood to refer to a portion of memory that is used to hold data elements for processing. For example, incoming data elements to be processed by a processor may be added to a buffer. When the processor is ready to process one or more of the elements, the processor (or a thread thereof) may remove one or more elements from the buffer and process them. The buffer is configured such that the rate of processing of the elements need not necessarily match the rate at which the elements are received into the buffer.

BRIEF DESCRIPTION OF THE DRAWINGS

Certain embodiments are disclosed with reference to the following drawings.

Figure 1:
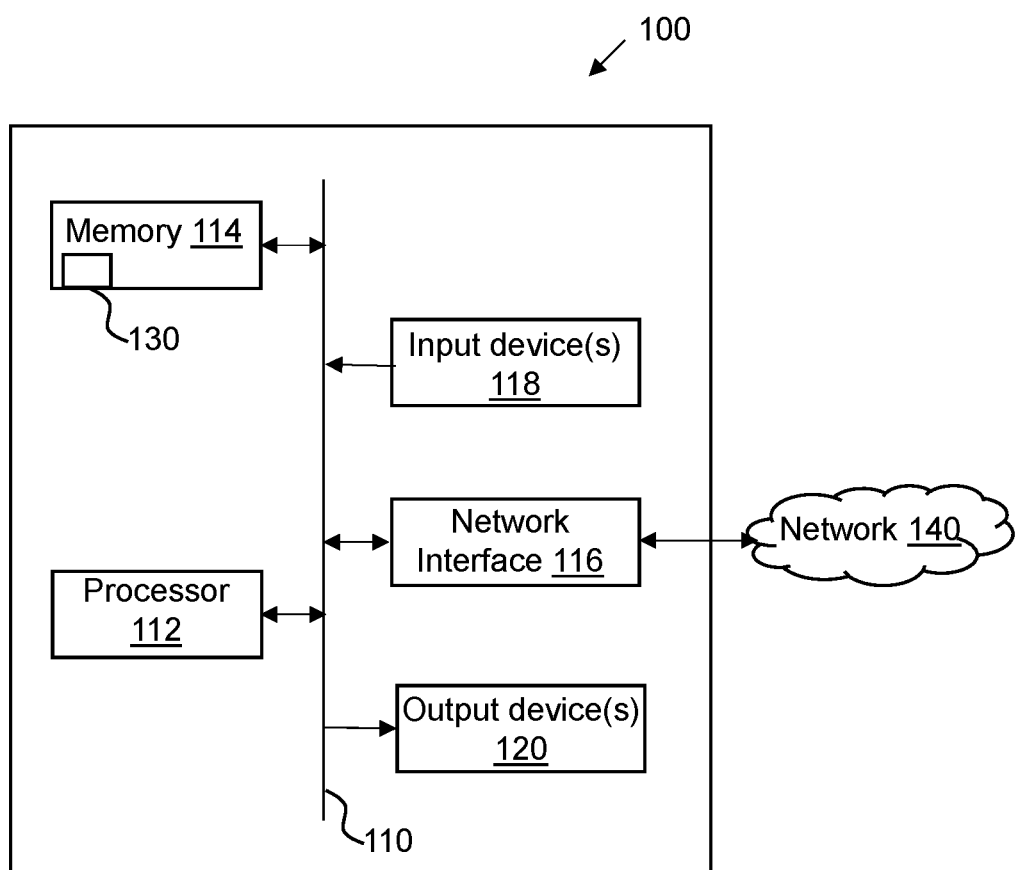
FIG. 1 illustrates a block diagram of an example computing device which may be used to implement certain embodiments.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

The disclosed embodiments generally relate to buffers, and in particular to systems and methods where elements are buffered for processing. A buffer, such as a ring buffer, may have capacity for a certain number of elements. This presents a risk of buffer overrun, where the number of elements added to the buffer exceeds the capacity of the buffer, possibly causing the elements to overwrite adjacent memory locations. In some cases, these adjacent memory locations may contain unprocessed data in the buffer, hence overwriting of this unprocessed data may cause the data to be lost.

In order to avoid buffer overrun, a flow control technique can be employed. Specifically, when the number of elements in the buffer is approaching or at the capacity of the buffer, flow control may be activated. When the flow control is activated, threads may be restricted from adding another element to the buffer, and instead the threads may spin (that is, repeatedly attempt to add the element to the buffer) until the number of elements in the buffer reduces.

However, this technique has drawbacks. One drawback is the impact that this technique can have on processes that add elements to the buffer. Specifically, such a process may be forced to wait until the number of elements in the buffer has reduced in order to proceed, which can block the process from advancing.

In certain scenarios, this blocking can, in turn, pose a risk of deadlock. Deadlock may refer to a situation where neither of two (or more) interdependent processes can logically progress. As one example, a particular thread may work on an element in a particular buffer and also add an element to the particular buffer. However, if the buffer approaches or is at capacity such that the above flow control is activated, the thread will spin when attempting to add the element to the buffer. And since the thread is spinning, the thread is not able to complete work on the element in the buffer and so the element will not be removed from the buffer. Accordingly, the number of elements in the buffer will not reduce and the thread may spin indefinitely; neither the addition nor the removal of elements can logically progress and hence a deadlock situation has occurred. As another example, deadlock may occur when a loop is established between two or more buffers. For example, if a first thread that removes elements from a first buffer and adds elements to a second buffer is spinning (for example because the second buffer is approaching or at capacity and hence the flow control is activated), and a second thread that removes elements from the second buffer and adds elements to the first buffer is spinning (for example because the first buffer is approaching or at capacity and hence the flow control is activated), then neither thread can logically progress; a deadlock situation has occurred.

Deadlock is undesirable because this can halt processing and require a restart of the processing, which is an inefficient use of resources and can also have undesirable consequences for the processing itself. As an example, deadlock in a real time message processing system can result in messages being lost, which can be highly undesirable. Moreover, the risk of deadlock itself is undesirable as this can place restrictions on the code that can be used involving the buffers. For example, code which involves, or risks, loops being established between the buffers may need to be avoided or rewritten in order to reduce the risk of deadlock. This can limit the way in which the buffers can be used. It would be desirable to mitigate at least some of these drawbacks.

I. BRIEF DESCRIPTION OF CERTAIN EMBODIMENTS

Certain embodiments provide a system including: a memory configured to provide: a first buffer for storing a number of elements for processing; and a second buffer for storing elements for adding to the first buffer. The system also includes at least one processor configured to: obtain an element to be processed; determine that the number of elements in the first buffer is greater than a first threshold; and add the obtained element to the second buffer. By providing the second buffer for storing elements for adding to the first buffer, and adding the obtained element to the second buffer when the number of elements in the first buffer is greater than a first threshold, overrun of the first buffer can be prevented while nonetheless allowing that the processor can add the element to a buffer. A process attempting to add an element to the first buffer therefore need not wait until the number of elements in the first buffer has reduced; rather the at least one processor will add this element to the second buffer. Blocking of such a process may therefore be avoided, and hence the overall speed of such a process may be improved. Moreover, this allows for the risk of deadlock to be eliminated. Specifically, even when the number of elements in the first buffer is greater than the first threshold, the at least one processor (specifically, a worker thread thereof) will not spin attempting to add an element to the first buffer, but rather will add the element to the second buffer. The worker thread will therefore be able to logically progress even when the number of elements in the first buffer is greater than the first threshold, and hence the risk of deadlock involving the first buffer is eliminated. Eliminating the risk of deadlock may, in turn, avoid or reduce the risk of needing to restart processing, which may improve the overall efficiency of the system and/or help avoid elements in the buffers being lost. Moreover, eliminating the risk of deadlock with the first buffer may improve the flexibility with which the first buffer can be used. For example, as the risk of deadlock is eliminated, code can be written without the requirement to avoid loops between buffers, which may in turn allow for simpler and/or more efficient code. Moreover, eliminating the risk of deadlock with the first buffer may allow for the size of the first buffer to be reduced, thereby reducing memory requirements. For example, without the second buffer, the first buffer may need to be made relatively large in order reduce the risk of deadlock, for example according to expected peak element addition rates or buffer use. However, by eliminating the risk of deadlock with the second buffer, the first buffer (which may, for example, be provided by a ring buffer) need not be sized according to these parameters and may be made smaller without risking deadlock.

In certain embodiments, the at least one processor is further configured to: based at least in part on a determination that the number of elements in the first buffer is less than the first threshold, add the obtained element to the first buffer. This may provide that in 'normal' operation, that is when the number of elements in the first buffer is less than the first threshold, the element is added to the first buffer. This provides for efficient processing of the elements, that is, only involving the first buffer in normal operation, but also for the second buffer to be used if the first buffer is approaching or at its capacity, thereby eliminating the risk of deadlock, for example.

In certain embodiments, the at least one processor is configured to: set an overflow flag when the number of elements in the first buffer is greater than the first threshold; and wherein the at least one processor is configured to determine that the number of elements in the first buffer is greater than the first threshold by determining that the overflow flag is set. This provides an efficient way to implement the determination that the number of elements in the first buffer is greater than the threshold. If the at least one processor tests the overflow flag and it is set, the at least one processor can directly add the obtained element to the second buffer. This may be more computationally efficient than, for example, obtaining a count of the number of elements in the first buffer and then comparing it to the first threshold.

In certain embodiments, the at least one processor is further configured to: determine that the number of elements in the first buffer is less than a second threshold, wherein the second threshold is lower than the first threshold; and remove an element from the second buffer and add the removed element to the first buffer. This helps ensure that when the number of elements in the first buffer has reduced sufficiently, for example such there is no risk of overrun of the first buffer, elements are removed from the second buffer and added to the first buffer. This helps ensure that the first buffer (which may be configured for high performance, for example as a ring buffer), is used to process the elements. It is noted that, as long as the second threshold is equal to or greater than one element, the use of the second buffer may add no latency to the processing of the elements from the first buffer.

In certain embodiments, the first buffer is a first queue for queuing a number of elements for processing, and the second buffer is a second queue for queuing elements for adding to the first queue. This may help provide that the elements can be processed in sequence, that is, in the order in which they are obtained. This can be important for certain elements, such as protocol messages to maintain a session between a client device and a host, as well as some other types of messages.

In certain embodiments, the at least one processor is further configured to: determine that a number of elements in the second buffer is greater than zero; and add the obtained element to the second buffer. This may help ensure that the elements are processed in the order in which they are obtained. For example, if there are elements already waiting in the second queue, the at least one processor does not post to the first queue but rather to the second queue. As mentioned above, processing elements in the order in which they are obtained can be important for certain types of elements, and this may help implement such sequential processing requirements.

In certain embodiments, the at least one processor is further configured to: determine that the second buffer is empty and that the number of elements in the first buffer is less than the first threshold; and add the obtained element to the first buffer. This may help ensure that the elements are processed in the order in which they are obtained. For example, only when there are no elements waiting in the second buffer, and the number of messages in the first buffer is less than the first threshold, may the at least one processor add an obtained message to the first buffer. This may help implement sequential processing requirements.

In certain embodiments, the at least one processor is configured to: set an overflow flag when the number of elements in the first buffer is greater than the first threshold; and reset the overflow flag when the second buffer is determined to be empty, wherein the at least one processor is configured to determine that the second buffer is empty and the number of elements in the first buffer is less than the first threshold by determining that the overflow flag is reset. This may provide an efficient way to implement the determination that the second buffer is empty and the number of elements in the first buffer is less than the first threshold; that is, by referring to a single flag. This may be more computationally efficient than, for example, making the respective determinations individually and/or explicitly each time.

In certain embodiments, the first buffer is a ring buffer. This allows for high performance. Specifically, due to the contiguous nature of the memory in a ring buffer, elements can be read quickly from it. Ring buffers by their nature are of limited size, meaning the provision of the second buffer may allow for the performance of the ring buffer to be provided while also eliminating the risk of deadlock.

In certain embodiments, the second buffer is a queue for queuing elements for adding to the first buffer. This may help implement sequential processing requirements. In certain embodiments, the second buffer is an unbounded buffer. This may ensure the second buffer does not get full. The second buffer may be, for practical purposes, unbounded. That is, although the second buffer may technically have a capacity, that capacity may be so large that for practical purposes the second buffer may be considered unbounded. That is, for practical purposes, there may be no risk of the second buffer becoming full. This may help reduce or eliminate the risk of buffer overrun in the second buffer.

In certain embodiments, the at least one processor is configured to implement a number of worker threads that add to the first buffer, wherein the first threshold is at most the total number of elements for which the first buffer has capacity less the number of worker threads. This may provide a maximum for the first threshold while still ensuring that the first buffer does not overrun. For example, each worker thread may add an element to the first buffer one element at a time. Even if it so happened that all of the total number of worker threads added an element to the first buffer at the same time, then the first buffer would not overrun and further elements would be added by the worker threads to the second buffer. This may help ensure that no elements are lost or overwritten, while also ensuring that a capacity of first buffer may be utilized.

In certain embodiments, the elements are messages, and the at least one processor is configured to obtain the element by receiving a message from an external entity via a communications interface. This may help ensure that a process of receiving messages at the communications interface is not blocked in case the number of messages in the first buffer is greater that the first threshold. This may, in turn, help ensure messages are not lost.

In certain embodiments, the at least one processor is configured to obtain the element by removing an element from a third buffer. In examples, processing of an element from the first buffer may include adding an element to the third buffer. This situation might ordinarily pose a risk of deadlock. However, having the at least one processor adding the obtained element to the second buffer when the number of elements in the first buffer is greater than a threshold eliminates this risk of deadlock. Accordingly, the element can be obtained safely, that is, without the risk of deadlock, from any third buffer, even if processing of elements from the first buffer includes adding an element to the third buffer. In examples, the first buffer may be an order queue, and the third buffer may be a worker queue.

In certain embodiments, the elements are each a reference to a queue of one or more messages. The first queue may be a worker queue, to which a reference to a queue of one or more messages may be added, for example a reference to a session queue or an action queue. This may allow that the risk of process blocking and/or deadlock can be eliminated even where the first buffer is a buffer to which a reference to a queue of one or more messages is added by a worker thread.

In certain embodiments, the elements relate to messages, the system includes a server system including the at least one processor and the memory, and the server system is configured to facilitate messaging between a host system and one or more client systems. For example, the server system may implement a connector that facilitates messaging between a host system and one or more client systems. It can be particularly important to avoid process blocking and/or deadlock in such a server system because if messages, such as protocol messages, are not processed within a certain time then a connection between host system and one or more of the client systems may be dropped. In examples, the elements may relate to messages in that the elements may be messages, references to messages, references to queues of messages, or references to queues of references to messages.

In certain embodiments, one or more of the client systems include a trading device and the host system includes an electronic exchange. It can be particularly important to avoid process blocking and/or deadlock in such system because the timing of messages between a trading device and an electronic exchange may be critical. Further, eliminating the risk of deadlock reduces the risk of needing to restart the system, which may otherwise involve lost messages and/or a resource intensive message reconciliation process. A more efficient and/or consistent trading connector may therefore be provided.

In certain embodiments, the server system is configured to establish a plurality of connections between the host system and a respective plurality of client systems, wherein the memory is configured to provide a first buffer and an associated second buffer for each of the plurality of connections, and wherein the at least one processor is configured to, for at least some of the connections, add elements (such as messages or references to messages) to the respective first buffer or second buffer for that connection. Having different first and second buffers for each different connection may help ensure that a burst of messaging on a first connection does not affect the rate of processing on a second connection; rather, the burst of messages will be added to the second buffer for the first connection. This may allow for the system to operate consistently across connections. This may also allow for parallelization of the processing of messages from different connections, which helps improve processing speed.

In certain embodiments, the messaging between the host system and the one or more client systems is bi-directional, the memory is configured to provide a first buffer and an associated second buffer for each of a first messaging direction and a second messaging direction, and the at least one processor is configured to, for each messaging direction, add messages elements (such as messages or references to messages) to the respective first buffer or second buffer for that direction. Having different first and second buffers for each messaging direction may help ensure that a burst of messages in one direction does not affect the rate of processing in the other direction. This may allow, for example, for messages from the host to be delivered to the client devices even in the case that processing of messages from one or more client devices to the host is relatively slow. This may also allow for parallelization of the processing of messages in different messaging directions, which, in turn, help improve processing speed.

In certain embodiments, the server system includes an order connector of an electronic trading platform, and the order connector incudes the at least one processor and the memory. An electronic trading platform may be a particular context in which it is important that messages (for example, trade orders and/or execution reports) are processed quickly, there is no drop in the connection between the trading device and the exchange (as this can result in the cancelation of all trade orders for a session), certain sequencing requirements are implemented, and/or the rate of processing on one connection is not influenced by the rate of processing on another connection. This is therefore a context in which certain embodiments may find particular utility.

Certain embodiments provide a method including: providing, in a memory: a first buffer for storing a number of elements for processing; and a second buffer for storing elements for adding to the first buffer. The method also includes: by at least one processor: obtaining an element to be processed; determining that the number of elements in the first buffer is greater than a first threshold; and adding the obtained element to the second buffer.

Certain embodiments provide a tangible computer readable medium comprising instructions which, when executed, cause a machine to at least: provide, in a memory: a first buffer for storing elements for processing; and a second buffer for storing elements for adding to the first buffer; and by at least one processor: obtain an element to be processed; determine that the number of elements in the first buffer is greater than a first threshold; and add the obtained element to the second buffer.

II. EXAMPLE COMPUTING DEVICE

FIG. 1 illustrates a block diagram of an example computing device 100. The computing device 100 may be used to implement certain embodiments described herein. In other examples, other computing devices may be used. The computing device 100 includes a communication bus 110, a processor 112, a memory 114, a network interface 116, an input device 118, and an output device 120. The processor 112, memory 114, network interface 116, input device 118 and output device 120 are coupled to the communication bus 110. The computing device 100 is connected to an external network 140, such as a local area network (LAN) or a wide area network (WAN), like the Internet. The computing device is connected to the external network 140 via the network interface 116. The computing device 100 may include additional, different, or fewer components. For example, multiple communication buses (or other kinds of component interconnects), multiple processors, multiple memory devices, multiple interfaces, multiple input devices, multiple output devices, or any combination thereof, may be provided. As another example, the computing device 100 may not include an input device 118 or output device 120. As another example, one or more components of the computing device 100 may be combined into a single physical element, such as a field programmable gate array (FPGA) or a system-on-a-chip (SoC).

The communication bus 110 may include a channel, electrical or optical network, circuit, switch, fabric, or other mechanism for communicating data between components in the computing device 100. The communication bus 110 may be communicatively coupled with and transfer data between any of the components of the computing device 100.

The processor 112 may be any suitable processor, processing unit, or microprocessor. The processor 112 may include one or more general processors, digital signal processors, application specific integrated circuits, FPGAs, analog circuits, digital circuits, programmed processors, and/or combinations thereof, for example. The processor 112 may be a multi-core processor, which may include multiple processing cores of the same or different type. The processor 112 may be a single device or a combination of devices, such as one or more devices associated with a network or distributed processing system. The processor 112 may support various processing strategies, such as multi-processing, multi-tasking, parallel processing, and/or remote processing. Processing may be local or remote and may be moved from one processor to another processor. In certain embodiments, the computing device 100 is a multi-processor system and, thus, may include one or more additional processors which are communicatively coupled to the communication bus 110.

The processor 112 may be operable to execute logic and other computer readable instructions encoded in one or more tangible media, such as the memory 114. As used herein, logic encoded in one or more tangible media includes instructions which may be executable by the processor 112 or a different processor. The logic may be stored as part of software, hardware, integrated circuits, firmware, and/or micro-code, for example. The logic may be received from an external communication device via a communication network 140. The processor 112 may execute the logic to perform the functions, acts, or tasks described herein.

The memory 114 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 114 may include any desired type of mass storage device including hard disk drives, optical media, magnetic tape or disk, etc.

The memory 114 may include one or more memory devices. For example, the memory 114 may include cache memory, local memory, a mass storage device, volatile memory, non-volatile memory, or a combination thereof. The memory 114 may be adjacent to, part of, programmed with, networked with, and/or remote from processor 112, so the data stored in the memory 114 may be retrieved and processed by the processor 112, for example. The memory 114 may store instructions which are executable by the processor 112. The instructions may be executed to perform one or more of the acts or functions described herein.

The memory 114 may store an application 130 implementing the disclosed techniques. In certain embodiments, the application 130 may be accessed from or stored in different locations. The processor 112 may access the application 130 stored in the memory 114 and execute computer-readable instructions included in the application 130.

The network interface 116 may include one or more network adaptors. The network adaptors may be wired or wireless network adaptors. The network interface 116 may allow communication by the computing device 100 with an external network 140. The computing device 100 may communicate with other devices via the network interface 116 using one or more network protocols such as Ethernet, Internet Protocol (IP), Transmission Control Protocol (TCP), User Datagram Protocol (UDP), wireless network protocols such as Wi-Fi, Long Term Evolution (LTE) protocol, or other suitable protocols.

The input device(s) 118 may include a positional input device, such as a mouse, touchpad, touchscreen, or the like; a keyboard, button, switch, or the like; and/or other human and machine interface devices. The output device(s) 120 may include a display, which can be a liquid crystal display (LCD), a cathode-ray tube (CRT), a light emitting diode (LED) display (such as an OLED display), or other suitable display.

In certain embodiments, during an installation process, the application may be transferred from the input device 118 and/or the network 140 to the memory 114. When the computing device 100 is running or preparing to run the application 130, the processor 112 may retrieve the instructions from the memory 114 via the communication bus 110.

III. EXAMPLE SYSTEM

Figure 2:
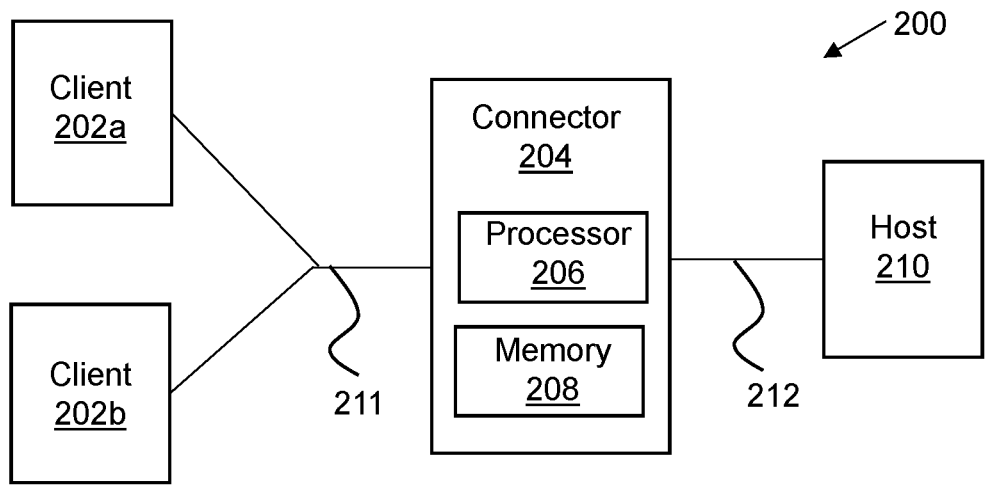
FIG. 2 illustrates a block diagram of an example system in which certain embodiments may be implemented.

FIG. 2 illustrates an example system 200 in which certain embodiments disclosed herein may be employed. The system 200 includes client devices 202a, 202b, a connector 204, and a host 210. Each of the client devices 202a, 202b, the connector 204, and the host 210 may be provided by a respective computing device such as the computing device 100 according to any of the examples described above with reference to FIG. 1. The connector 204 may be provided by a server system. As shown in FIG. 2, the connector 204 includes a processor 206 and a memory 208. The processor 206 and/or the memory 208 may be the same or similar to the processor 112 and/memory 114, respectively, of the computing device 100 described above with reference to FIG. 1. Each client device 202a, 202b is in communication with the connector 204 over a first network 211. The first network 211 may include, for example, a local area network (LAN) and/or a wide area network (WAN) such as the Internet. The connector 204 is in communication with the host 210 over a second network 212. The second network 212 may include a LAN, a WAN, a shared memory system, and/or a proprietary network. In examples, the first network 211 and the second network 212 may be the same network.

The connector 204 is located between the client devices 202a, 202b and the host 210. In this example, the connector 204 acts as mediator between the client devices 202a, 202b and the host 210. Specifically, the connector 204 performs protocol translation for data communicated between the client devices 202a, 202b and the host 210. In this example, the connector 204 processes messages received from the client devices 202a, 202b into a data format understood by the host 210. The connector 204 also processes messages received from the host 210 into a format understood by the client devices 202a, 202b. For example, a client device 202a, 202b may send a request message to the host 210 via the connector 204, the host 210 may execute the request in the request message, and send a response message to the client device 202a, 202b via the connector 204, indicating the extent to which the request has been executed. Messages are received by the connector 204 on a network interface (not shown in FIG. 1 but see the network interface 110 of the example computing device 100 of FIG. 1) of the connector 204. Messages received by the connector 204 are processed by the processor 206. Before being processed, received messages are temporarily stored in the memory 208, specifically, in buffers implemented by the memory 208 as described in more detail below.

Figure 3:
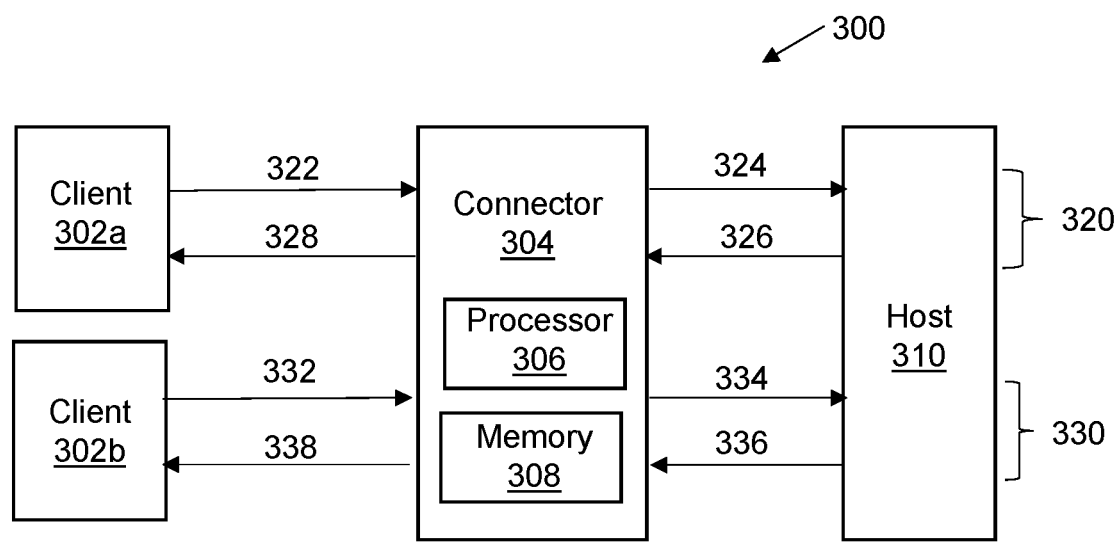
FIG. 3 illustrates a block diagram of another example system in which certain embodiments may be implemented.

FIG. 3 illustrates an example system 300 in which certain embodiments disclosed herein may be employed. The example system 300 may be the same or similar to the example system 200 described above with reference to FIG. 2. The example system includes client devices 302a, 302b, a connector 304 having a processor 306 and a memory 308, and a host 310. The client devices 302a, 302b, the connector 304, and the host 310 may be the same as or similar to the client devices 202a, 202b, the connector 204, and the host 210, respectively, of any of the examples described above with reference to FIGS. 1 and 2.

As can be seen in FIG. 3, each client device 302a, 302b establishes a respective connection or session 320, 330 with the host 310 via the connector 304. The connector 304 may establish a separate connection with the host 310 for each session 320, 330. Each session 320, 330 may be established using a suitable communications protocol. As an example of messages in a first session 320, a first client device 302a may send a first message 322, such as a request, to the connector 304, the connector 304 may process the first message 322 to generate a translated version of the first message 324, and the connector 304 may send this translated message 324 to the host 310. The host 310 may perform an action based on the received message 324, and send a second message 326, such as a response, to the connector 304. The connector 304 may process the second message 326 to generate a translated version of the second message 328, and the connector 304 may send this translated message 328 to the client device 302a. Each of the messages 322, 324, 326 and 328 are in the same, first, session 320. As such, each of the messages 322, 324, 326 and 328 have the same session identifier. Similarly, in a second session 330, a second client device 302b may send a first message 332, such as a request, to the connector 304, the connector 304 may process the first message 332 to generate a translated version of the first message 334, and the connector 304 may send this translated message 334 to the host 310. The host 310 may perform an action based on the received message 334, and send a second message 336, such as a response, to the connector 304. The connector 304 may process the second message 336 to generate a translated version of the second message 338, and the connector 304 may send this translated message 328 to the client device 302a. Each of the messages 332, 334, 336 and 338 are in the same, second, session 330. As such, each of the messages 332, 334, 336, 338 have the same session identifier (different from the session identifier of messages in the first session 320).

The messages 322, 332 received by the connector 304 from the client devices 302a, 302b, are referred to herein as outbound messages, and the messages 326, 336 received by the connector 304 from the host 310 are referred to herein as inbound messages.

IV. QUEUEING

In examples, it can be important that the connector 304 processes some of the messages in the order in which they are received. One example is messages from a client device 302a, 302b (or alternatively from the host 310) that relate to a particular action of the host 310. For example, for a particular action of the host 310, a particular client device 302a may send a request message to request that the particular action may be performed followed by a cancellation or change message cancelling or changing, respectively, the request in the request message. It can be important that the connector 304 processes these messages in the order that are received at the order connector 304, as if the cancellation or change message was sent to the host 310 before the request message, the request would not be cancelled or changed, respectively. Another example is protocol messages, for example messages between a particular client device 302a, 302b and the host 310 to establish or maintain the session 320, 330. An example of a protocol message is a 'heartbeat' message, which may be sent from the host 310 to a particular client device 302a, 302b (or from the client device 302a, 302b to the host 310) periodically to check that the particular client device 302a, 302b (or host 310) is still there and hence that the associated session 320, 330 should be maintained. It can be important that the connector 304 processes protocol messages in the order that are received at the connector 304, as otherwise steps of the protocol may not be carried out in the expected order, which may cause the session to end.

In order for the connector 304 to process certain messages in the order that they are received, the connector 304 makes use of queues. A queue may refer to a buffer that holds elements to be processed in a certain order. Specifically, a queue is a First-In-First-Out (FIFO) buffer, whereby elements are processed from the queue in the same order in which they are added to the queue. As messages are received at the connector 304, the messages (or references to those messages) may be placed in a queue in the memory 308, where they may be held until the processor 306 is available to process them.

Processing all of the messages in the order in which they are received by the connector 304 may place limitations on the speed with which the messages can be processed. Specifically, speed can be increased by parallelizing the processing of some of the messages. That is, processing some of the messages concurrently. In particular, where messages from different sessions 320, 330 are not ordered with respect to one another, messages from different sessions 320, 330 can be processed concurrently. Further, where messages relating to different actions of the host 310 are not ordered with respect to one another, messages relating to different actions of the host 310 can be processed concurrently. Further, where messages received from different directions (that is, inbound and outbound messages) are not ordered with respect to one another, inbound and outbound messages received at the connector 304 can be processed concurrently.

Figure 4:
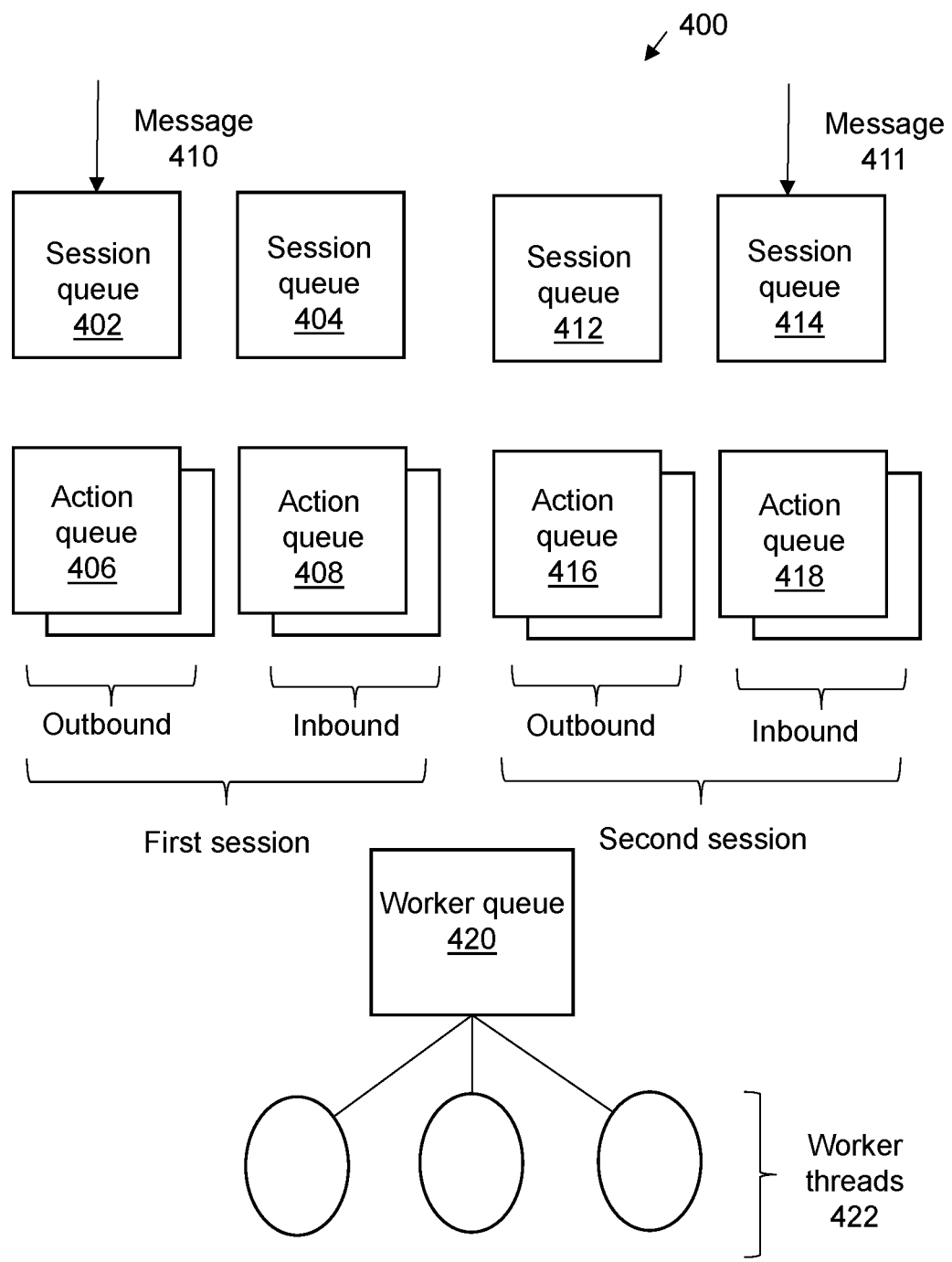
FIG. 4 illustrates a block diagram of queues and worker threads according to an example.

FIG. 4 illustrates an architecture 400 of buffers and worker threads that may be employed by the connector 204, 304 according to an example. In this example, each buffer is a queue. The architecture 400 allows for processing of some messages in the order in which they are received, as well as for processing of some of the messages concurrently. Referring to FIG. 4, the architecture 400 includes, for a first session (such as the first session 320 described above with reference to FIG. 3), an outbound session queue 402 and an inbound session queue 404, and an outbound set of action queues 406 and an inbound set of action queues 408. The architecture 400 also includes, for a second session (such as the second session 330 described above with reference to FIG. 3) an outbound session queue 412 and an inbound session queue 414, and an outbound set of action queues 416 and an inbound set of action queues 418. The architecture 400 also includes a worker queue 420, and a pool of worker threads 422.

Each session queue 402, 404, 412, 414 relates to a particular session. For brevity, FIG. 4. Illustrates queues relating to only two sessions. However, it will be appreciated that the architecture 400 may include more or fewer session queues as necessary depending on the number of sessions that have been established between client devices and the host. Each set of action queues 406, 408, 416, 418 relate to a particular session, and within a particular set, each action queue relates to a different action of the host. Each different action may be associated with a respective different action ID. An action ID may be included in all messages relating to a particular working action of the host, in order to identify the working action to which the message relates. The outbound queues 402, 412, 406, 408 relate to messages that are received from a client device, and the inbound queues 404, 408, 414, 418 relate to messages that are received from the host. In this example, each session queue 402, 404, 412, 414 and action queue 406, 408, 416, 418 is a queue of one or more messages. In examples, the session queue 402, 404, 412, 414 and/or action queue 406, 408, 416, 418 may not store the one or more messages, but rather one or more references to the respective one or more messages. For example, for a particular message, the message itself may be stored elsewhere in the memory 208, 308 and the reference in the queue 402, 404, 412, 414, 406, 408, 416, 418 may indicate the location at which the message is stored and from which it can be accessed. The worker queue 420 may include references to queues of one or more messages, specifically references to session and/or action queues, as described in more detail below. That is, the worker queue 420 may be a queue of queue references.

The queues 402, 404, 406, 408, 412, 414, 416, 418, 420 are each portions of a memory of the connector 304 (such as the memory 308 described above with reference to FIG. 3). Specifically, each queue 402, 404, 406, 408, 412, 414, 416, 418, 420 may be implemented as a ring buffer. Each worker thread 422 may represent a virtual core of a physical processor (such as the processor 306 described above with reference to FIG. 3). Each worker thread 422 in the pool is assigned a task, carries out the task, and when the task is completed, the worker thread 422 returns to the pool ready to be assigned another task. Each worker thread 422 works on one task at a time, but different worker threads 422 in the pool can work on different tasks concurrently. In FIG. 4, three worker threads 422 are shown, but it will be appreciated that more or fewer worker threads could be used as desired. The worker threads 422 obtain queue references from the worker queue 422 to and processes the one or more messages of the referenced queues (such as a session queue 402, 404, 412, 414 or an action queue 406, 408, 416, 418).

As an illustrative example of the operation of the architecture 400, within the first session, a first message 410 from a client device is received. The message 410 is added to the outbound session queue 402 associated with the first session. At this point, the session queue 402 may have one or more messages in it, depending on how many messages have been added to the session queue 402. The session queue 402 is added to the worker queue 420. That is, a reference to the session queue 402 is added to the worker queue 420. A worker thread 422 obtains the reference to the session queue 402 from the worker queue 420, and processes the one or more messages of the referenced session queue 402. Specifically, for each of the one or more messages of the referenced session queue 402, the worker thread 422 deserializes the message. If the message does not relate to a particular action and hence does not include an action ID, for example is a protocol message, the worker thread 422 may process the message as needed and forward this to the host as needed. However, if the message relates to a particular action, the worker thread 422 determines the action ID included in the message and adds the deserialized message to the action queue 406 associated with the determined action ID. The worker thread 422 then adds the action queue 406 to the worker queue 420. That is, a reference to the action queue 406 is added to the worker queue 420. A worker thread 422 obtains the reference to the action queue 406 from the worker queue 420, and executes processing of the one or more messages of the referenced action queue 406. For example, this may involve translating the message so as to be understood by the host and forwarding the translated message to the host.

At the same time as the first message 410 is received, a second message 411 from the host may be received within the second session. The second message 411 is added to the inbound session queue 414 associated with the second session. The session queue 414 is added to the worker queue 420. That is, a reference to the session queue 414 is added to the worker queue 420. A worker thread 422 obtains the reference to the session queue 414 from the worker queue 420 and processes the one or more messages of the referenced session queue 414. Specifically, for each of the one or more messages of the session queue 414, the worker thread 422 deserializes the message. If the message does not relate to a particular action and hence does not include an action ID, for example is a protocol message, the worker thread 422 may process the message as needed and forward this to the host as needed. However, if the message relates to a particular action, the worker thread 422 determines the action ID included in the message, and adds the deserialized message to the action queue 418 associated with the determined action ID. The worker thread 422 then adds the action queue 418 to the worker queue 420. That is, a reference to the action queue 418 is added to the worker queue 420. A worker thread 422 obtains the reference to the action queue 418 from the worker queue 420 and executes processing of the one or more messages of the referenced action queue 418. For example, this may involve translating the message so as to be understood by the client device and forwarding the translated message to the client device.

According to the architecture 400, protocol messages and messages relating to particular action IDs for a particular session and a particular message direction are processed in the order in which they are received. However, messages on different sessions, with different message directions, and/or relating to different action IDs can be processed concurrently. The architecture 400 may therefore provide for fast processing of the messages while allowing for processing of some messages in the order in which they are received.

V. FLOW CONTROL AND DEADLOCK

As mentioned, each queue 402, 404, 406, 408, 412, 414, 416, 418, 420 may be implemented as a ring buffer, which is of fixed size. When implemented as a ring buffer, each queue has a fixed capacity for messages (or references to messages, or references to queues, as appropriate). Accordingly, for each queue there is the possibility the queue can get full. Adding a message to an already full queue implemented as a ring buffer would result in buffer overrun and specifically overwriting of the first message in the queue. This would cause the first message in the queue to be lost. In order to avoid this, a flow control scheme may be used. According to the flow control scheme, when the number of messages in a particular queue 402, 404, 406, 408, 412, 414, 416, 418, 420 reaches a particular threshold, worker threads 422 are restricted from adding another message to the particular queue and instead the worker threads 422 spin (that is, repeatedly attempt to add the message to the particular queue) until the number of messages in the particular queue reduces. While this prevents overrun, this control scheme has drawbacks. A particular drawback is the risk of deadlock.

Figure 5:
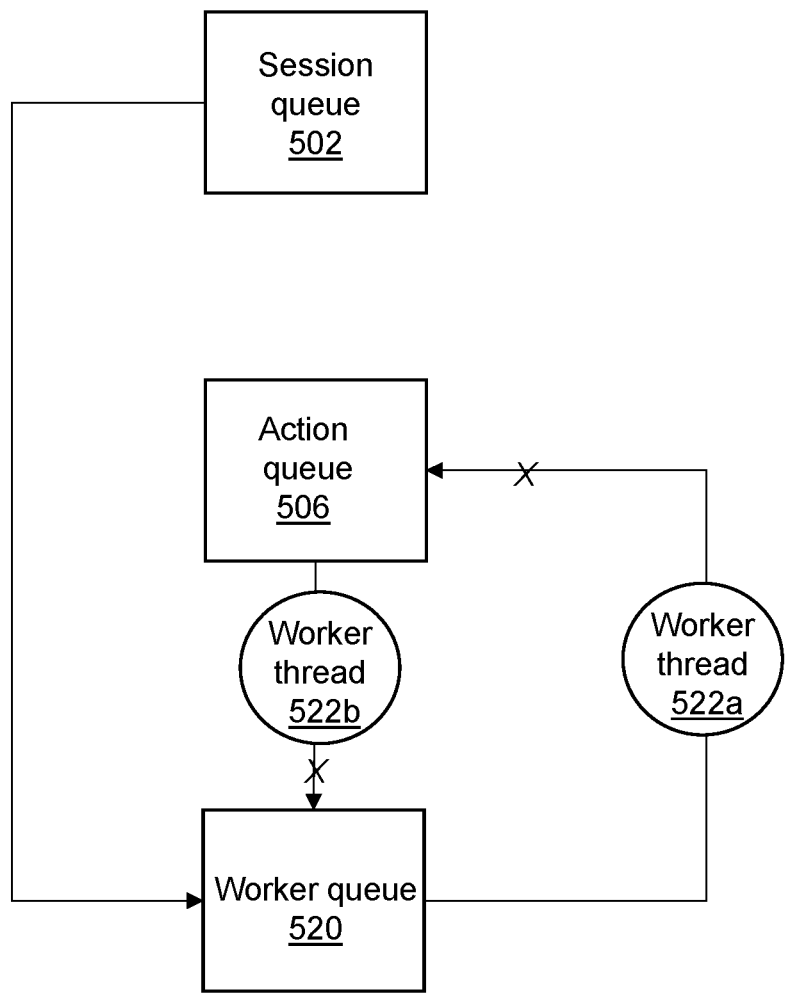
FIG. 5 illustrates a block diagram of a flow of data between queues, according to an example.

FIG. 5 illustrates an example situation in which the flow control scheme mentioned above can cause deadlock. In the block diagram of FIG. 5 there is represented a session queue 502, an action queue 506, a worker queue 520 and two worker threads 522a, 522b. The session queue 502 and the action queue 506 may be, for example, the session queue 402, 404, 412, 414 and action queue 406, 408, 416, 418 for any one of the particular sessions and message directions described above with reference to FIG. 4. The worker queue 520 and the worker threads 522a, 522b may be the same as or similar to the worker queue 420 and the worker threads 422, respectively, described above with reference to FIG. 4.

In a similar way to the process described above with reference to FIG. 4, in FIG. 5, a reference to the session queue 502 may be added to the worker queue 520. A first worker thread 522a may obtain the reference to the session queue 502 from the worker queue 520, obtain a message from the referenced session queue 502, deserialize the message, and attempt to add a the deserialized message to the action queue 506. However, the action queue 506 may be nearing or at its capacity such that the flow control scheme is activated for the action queue 506. In this case, the first worker thread 522a is prevented from adding the deserialized message to the action queue 506, and instead the worker thread 522a spins, that is, repeatedly attempts to add the deserialized message to the action queue 506 (indicated by an 'X' in FIG. 5). In the meantime, the worker queue 520 may itself be nearing or at its capacity such that the flow control scheme is activated for the worker queue 520. A second worker thread 552b may attempt to add a reference to the action queue 506 to the worker queue 520. However, since the flow control scheme has been activated for the worker queue 520, the second worker thread 522b is prevented from adding this reference to the action queue 506 to the worker queue 520, and instead the second worker thread 522b spins, that is, repeatedly attempts to add the reference to the action queue 506 to the worker queue 520 (indicated by an 'X' in FIG. 5). In this situation the first worker thread 522a is spinning waiting for the number of deserialized messages in the action queue 506 to reduce, but the number of deserialized messages in the action queue 506 cannot reduce because the reference to the action queue 506 cannot be added to the worker queue 520 because the second worker thread 552b is spinning waiting for the number of queue references in the worker queue 520 to reduce. In turn, the number of queue references in the worker queue 520 cannot reduce because the first worker thread 552a is spinning. The processing of messages has reached deadlock and therefore is unable to proceed.

Since the processing of messages is unable to proceed on deadlock, protocol messages such as 'heartbeat' messages will not be processed. If more than a certain number of protocol messages between a client device and the host are not processed, or a certain amount of time passes between protocol messages being exchanged between the client device and the host, then one or both of the host and the client device may conclude that the other is no longer participating in the session and may close the session. This may mean that messages sent by one or both of the client device and host may be lost.

The deadlock can be broken by a restart of the connector 204, 304, but this is time consuming and resource intensive, and also risks losing messages that were being queued or processed. Deadlock is therefore undesirable and it would be useful if the risk of deadlock could be eliminated. Moreover, the risk of deadlock itself is undesirable as this can place restrictions on the code that can be used involving the queues. For example, code which involves, or risks, worker threads 522a, 522b adding messages to the session queue 502 needs to be avoided or rewritten in order to reduce the risk of deadlock occurring between the worker queue 520 and the session queue 502. This can limit the way in which the queues can be used. It would be useful to allow for queues, or more generally buffers, to be used while eliminating the risk of deadlock.

It will be appreciated that FIG. 5 is just an example, and that deadlock, or the risk of deadlock, may occur or be present in other example situations or systems. As one example, there can be a risk of deadlock even where one queue is used. For example, a particular thread may process a message from a particular queue and also add a message to the particular queue. However, if the queue becomes full, according to the above control scheme, the thread will spin attempting to add the message to the queue. And since the thread is spinning, the thread is not able to process the message from the queue. Accordingly, the number of messages in the queue will not reduce and the thread will spin indefinitely; neither the addition nor the processing of messages can logically progress and hence a deadlock situation has occurred.

More broadly, even in cases where there may not be a risk of deadlock, the above control scheme has drawbacks. For example, the control scheme impacts processes that add messages to a queue, or more generally elements to a buffer. Specifically, such a process may be forced to wait until the number of messages in the queue has reduced in order to proceed, which may block the process from advancing. Such blocking can reduce the speed at which the process is carried out, which in turn can reduce the speed at which overall processing, for example performed by the connector 204, 304, can be carried out. As one example, the process may include the receipt of messages by the connector 204, 304 described above with reference to FIG. 2 to FIG. 4. For example, the control scheme may cause blocking of the receipt of outbound messages 322, 332, 410 and/or inbound messages 326, 336, 411 by the connector 304, which may cause instability in the functioning of the overall system 300. It would be useful to mitigate such drawbacks.

VI. OVERFLOW QUEUE

Figure 6:
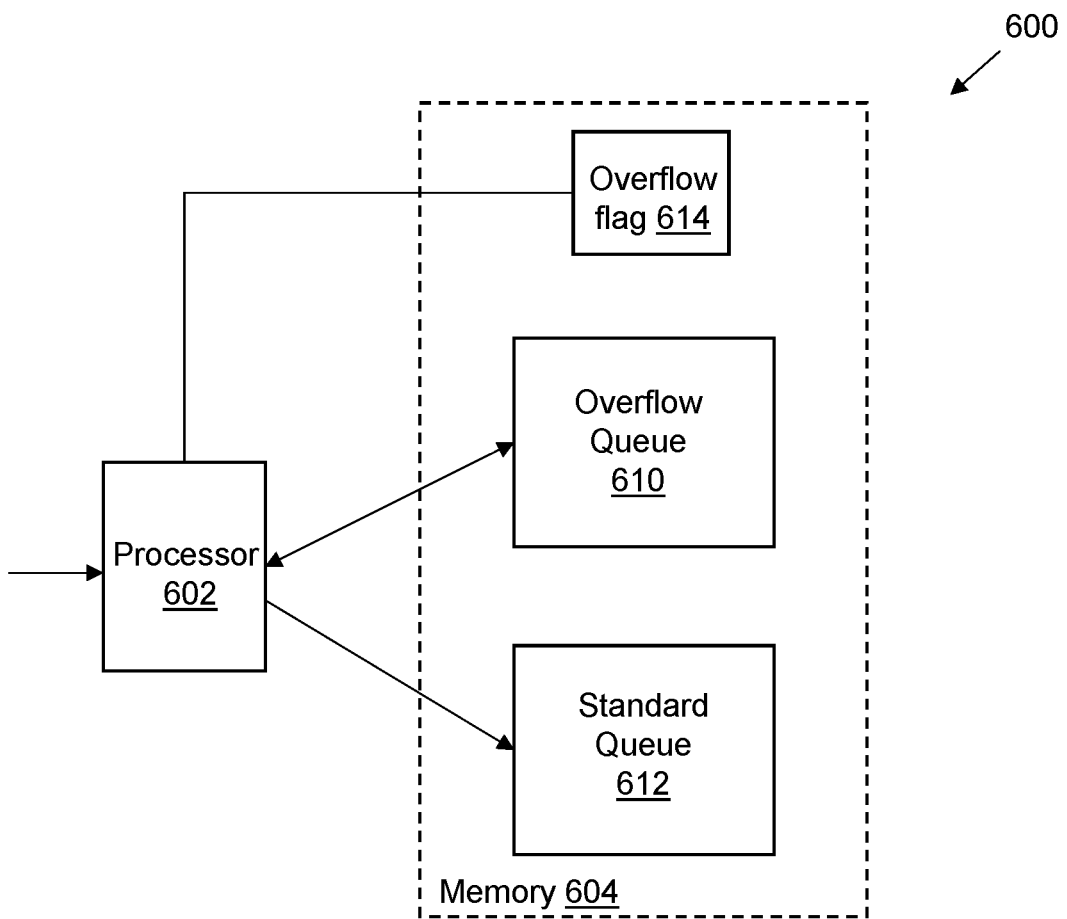
FIG. 6 illustrates a block diagram of a connector according to an example.

FIG. 6 illustrates a system 600 in which embodiments may be employed. The system 600 includes a memory 604 and a processor 602. The memory 604 may be the same or similar to the memory 114, 208, 308 according to any one of the examples described above with reference to FIG. 1 to FIG. 4. The processor 602 may be the same or similar to the processor 112, 206, 306, according to any one of the examples described above with reference to FIG. 1 to FIG. 4. The processor 602 and the memory 604 may be part of a server system 600. In examples, the server system 600 may be configured to facilitate messaging between a host system (such as the host 210, 310 according to any one of the examples described above with reference to FIG. 1 to FIG. 4) and one or more client systems (such as the client devices 202a, 202b, 302a, 302b according to any one of the examples described above with reference to FIG. 1 to FIG. 5). For example, the server system 600 may be part of or implement the connector 204, 304 according to any one of the examples described above with reference to FIG. 1 to FIG. 4.

In the system 600, the memory 604 is configured to provide a standard queue 612 (an example of a first buffer) and an overflow queue 610 (an example of a second buffer). The standard queue 612 is for storing a number of elements for processing. For example, for a particular queue 612, the elements may be any one of messages, references to messages, and references to queues, as appropriate. The overflow queue 610 is for storing elements for adding to the standard queue 612. The overflow queue 610 is associated with the standard queue 612 in that the overflow queue 610 is for storing elements for adding to the standard queue 612. The standard queue 612 has a fixed capacity, that is, has capacity only for a certain number of elements. In examples, the standard queue 612 is a ring buffer. In examples, the overflow queue 610 is unbounded. That is, the overflow queue 610 may have an unbounded capacity for elements. This may ensure the overflow queue 610 does not get full. It will be appreciated that although all memory may be theoretically bounded, the overflow queue 610 may be referred to as unbounded in the sense that the capacity is or may be made large enough that for practical purposes the overflow queue 612 may be considered unbounded. That is, in some examples, for practical purposes, there may be no risk of the overflow queue 612 becoming full and hence for practical purposes no risk of buffer overrun in the overflow queue 612.

The standard queue 612 in FIG. 6 may represent any one of the queues 402-420, 502, 506, 520 described above with reference to FIG. 1 to FIG. 5. That is, in examples, the standard queue 612 may represent any one of the session queues 402, 404, 412, 414, the action queues 406, 408, 416, 418, and the worker queue 420, for example as described above with reference to FIG. 1 to FIG. 5. For example, where the standard queue 612 represents a session queue 402, 404, 412, 414, the elements may be messages or references to messages, for example serialized messages. Where the standard queue 612 represents an action queue 406, 408, 416, 418, the elements may be messages or references to messages, for example deserialized messages. Where the standard queue 612 represents the worker queue 420, the elements may be queue references, that is references to sessions queues 402, 404, 412, 414 and or references to action queues 406, 408, 416, 418. Although for the sake of brevity only one standard queue 612 and one overflow queue 610 are shown in FIG. 6, it will be appreciated that in some examples the memory 604 may be configured to provide multiple standard queues 612, for example, one for each of one or more of the session queues 402, 404, 412, 414, the action queues 406, 408, 416, 418, and the worker queue 420 described above with reference to FIG. 1 to FIG. 5. In this case, the memory 604 may be configured to provide respective multiple overflow queues 610. For example, the memory 604 may be configured to provide one overflow queue 610 for each one of the standard queues 612. In this case, each overflow queue 610 may be associated with a respective standard queue 612 in that each overflow queue 610 is for storing elements for adding to the respective standard queue 612.

As described above with reference to FIG. 3 and FIG. 4, the connector 304 may establish multiple connections or sessions between the host system 310 and respective multiple client systems 302a, 302b. In these cases, where the system 600 implements the connector 304, the memory 604 may be configured to provide a standard queue 612 and an associated overflow queue 610 for each of the multiple sessions. For example, there may be a first standard queue (for example, the session queue 402, 404 or action queue 406, 408 of FIG. 4) and an associated first overflow queue for a first session, and a second standard queue (for example, the session queue 412, 414 or action queue 416, 418 of FIG. 4) and an associated second overflow queue for a second session. Further, as described above with reference to FIG. 3 and FIG. 4 the messaging between the host system 310 and the client systems 302a, 203b is bi-directional. In these cases, where the system 600 implements the connector 304, the memory 604 may be configured to provide a standard queue 612 and an associated overflow queue 610 for each of a first messaging direction (for example, outbound) and second messaging direction (for example, inbound). For example, there may be a first standard queue (for example, the session queue 402 or action queue 406 of FIG. 4) and an associated first overflow queue for a first messaging direction (for example outbound), and a second standard queue (for example, the session queue 404 or action queue 408 of FIG. 4) and an associated second overflow queue for a second messaging direction (for example, inbound).

Referring to FIG. 6, the processor 602 is configured to obtain an element to be processed. In some examples, the processor 602 obtains the element by receiving a message from an external entity via a communications interface (such as the network interface 116 of FIG. 1). For example, for outbound messages, the external entity may be client device 202a, 202b, 302a, 302b described above with reference to FIG. 2 to FIG. 3. As another example, for inbound messages, the external entity may be the host 210, 310 described above with reference to FIG. 2 to FIG. 3. In examples, the processor 602 may receive the message and determine to which session queue 402, 404, 412, 414, 502 the message (or reference to the message) is to be added, for example based on the session over which the message was received and/or the messaging direction of the message, for example as described above with reference to FIG. 3 to FIG. 5. In such examples, the standard queue 612 may represent a particular session queue 402, 404, 412, 414, 502 and the overflow queue 610 may represent an overflow queue 610 for and associated with that particular session queue 402, 404, 412, 414.

In some examples, the processor 602 obtains the element by removing an element from a third queue (not shown in FIG. 6). For example, the processor 602 may implement a worker thread (for example, the worker threads 422, 522a, 522b described above with reference to FIG. 4 and FIG. 5) that removes a message from a referenced session queue 402, 404, 412, 414, 502 so as to deserialize the message and add the deserialized message (or a reference thereto) to the appropriate action queue 406, 408, 416, 418, 506, for example as described above with reference to FIG. 4 and FIG. 5. In these examples, the standard queue 612 may represent an action queue 406, 408, 416, 418, 506, and the third queue (not shown) may represent a session queue 402, 404, 412, 414, 502. In these examples, the overflow queue 610 may represent an overflow queue 610 for and associated with the action queue 406, 408, 416, 418, 506.

In some examples, the processor 602 obtains the element by obtaining a reference to a queue, such as a reference to a session queue 402, 404, 412, 414 or a reference to an action queue 406, 408, 416, 418, 506. For example, a worker thread may add a message (or a reference to a message) to a session queue 402, 404, 412, 414 or action queue 406, 408, 416, 418, 506, and then add a reference to the session queue 402, 404, 412, 414 or the action queue 406, 408, 416, 418, 506 to the worker queue 420, 520, for example as described above with reference to FIG. 4 and FIG. 5. In these examples, the standard queue 612 may represent a worker queue 420, 520, and the overflow queue 610 may represent an overflow queue 610 for and associated with the worker queue 420, 520.

Irrespective of how the processor 602 obtains the element, for a particular standard queue 612 and associated overflow queue 610, the processor 602 is configured to add the obtained element to either the standard queue 612 or the overflow queue 610 associated with the standard queue 612. Specifically, the processor 602 is configured to, based on a determination that the number of elements in the standard queue 612 is greater than a first threshold T1, add the obtained element to the overflow queue 610. The processor 602 is configured to, based at least in part on a determination that the number of elements in the standard queue 612 is less than the first threshold T1, add the obtained element to the standard queue 612. Accordingly, the processor 602 (or a worker thread thereof) is able to add the element to a queue even if the number of elements in the standard queue 612 is above the first threshold, and hence blocking of processes can be avoided and the risk of deadlock associated with the standard queue 612 can be eliminated.

The first threshold T1 is less than the element capacity of the standard queue 612. In particular, the first threshold T1 may be set for the standard queue 612 in order to avoid overrun of the standard queue 612. That is, the first threshold may be set to a number of elements where the standard queue 612 is at or approaching its capacity for elements. For example, the standard queue 612 may be implemented as a ring buffer having a fixed number of element slots. Each element slot may have capacity for only one element. Hence the ring buffer may have capacity for a fixed number of elements. For example, where the elements are messages and the ring buffer holds messages, the ring buffer may have capacity for a fixed number of messages. Where the elements are references to messages and the ring buffer holds references to messages, the ring buffer may have capacity for a fixed number of references to messages. Where the elements are references to queues and the ring buffer holds references to queues, the ring buffer may have capacity for a fixed number of references to queues. The first threshold may be set to be less than the total number of elements for which the standard queue 612 has capacity. This may help ensure that when the standard queue 612 is at or nearing its capacity, new elements are added instead to the overflow queue 610, hence reducing the risk of overrun. In examples, the processor 602 may implement a particular number of worker threads (such as worker threads 422) that can add to the standard queue 612. In examples, the first threshold T1 may be at most the total number of elements for which the standard queue 612 has capacity less the number of worker threads. This may provide a maximum for the first threshold while still ensuring that the first buffer does not overrun. For example, each worker thread may add elements to the standard queue 612 one at a time. Even if it so happened that all of the total number of worker threads added an element to the standard queue 612 at the same time, then the first buffer would not overrun, but for a further element the first threshold would be exceeded and hence the processor would add the further element to the overflow queue 610.

For elements added to the standard queue 612, the processor 602 (for example, a worker thread thereof) may remove elements from the standard queue 612 for processing. For example, where the standard queue 612 is a session queue 402, 404, 412, 414, the processor 602 may remove a message from the standard queue 612, deserialize the message, and add the deserialized message (or a reference thereto) to the appropriate action queue 406, 408, 416, 418, 506 (for which an associated overflow queue may also be implemented in a similar way). As another example, where the standard queue 612 is a worker queue 420, 520, the processor 602 may remove a reference to a session queue 402, 404, 412, 414, or action queue 406, 408, 416, 418, 506 from the worker queue 420, 520 and process one or more messages of the referenced queue. As another example, where the standard queue 612 is an action queue 406, 408, 416, 418, 506, the processor 602 may remove a deserialized message from the action queue 406, 408, 416, 418, 506 and execute processing on the deserialized message for example so as to translate the message into a format understood by the client devices 202a, 202b, 302a, 302b or host 210, 310, as appropriate.

For elements added to the overflow queue 612, the processor 602 may add these messages to the standard queue 612. In examples, the functions of the processor 602 may be provided by at least one processor. In examples, at an appropriate time, a worker thread (such as a worker thread 422 of the pool described above with reference to FIG. 4) may use the processor 602 to remove messages from an overflow queue 610 and adds the messages to the associated standard queue 612. As such, the processor 602 may remove messages from multiple overflow queues 610 and add those messages to the appropriate associated standard queues 612. For each overflow queue 612, the processor 602 is configured to determine that the number of elements in the standard queue 612 is less than a second threshold T2 and based on the determination that the number of elements in the standard queue 612 is less than the second threshold T2, remove an element from the overflow queue 610 and add the removed element to the standard queue 612. The second threshold T2 may be lower than the first threshold T1.

The second threshold T2 may be set for the standard queue 612 to a point where there is a low or no risk of overrun of the standard queue. When the number of elements in the standard queue 612 has reduced sufficiently (for example by being removed from the standard queue 612 to be processed as discussed above), elements are removed (for example one by one) from the overflow queue 610 and added to the standard queue 612. This helps ensure that the elements are processed from the standard queue 612. In examples, the second threshold T2 is set to equal to or greater than one element. This may help ensure that, provided there are elements in the overflow queue 610, the standard queue 612 has at least one element in it. This may help ensure that the use of the overflow queue 610 adds minimal latency to the processing of the elements from the standard queue 612. In examples, the first threshold T1 may be between 80% and 98% of the capacity of the standard queue 612. In examples, the second threshold may be between 60% and 90% of the capacity of the standard queue 612. In a specific example, the capacity of a session queue 402, 404, 412, 414 may be 1024, the first threshold T1 may be 1000 (that is, 98% of the capacity) and the second threshold T2 may be 900 (that is, 88% of the capacity). In another specific example, the capacity of an action queue 406, 408, 416, 418, 506 may be 64, the first threshold T1 may be 54 (that is, 84% of the capacity), and the second threshold T2 may be 44 (that is, 69% of the capacity. Other examples may be used.

Once an element is removed from the overflow queue 610 and added to the associated standard queue 612, the element may be processed from the standard queue 612, for example in the manner described above.

In examples, the processor 602 is configured to add the obtained element to the overflow queue 610 based additionally on a determination that the number of elements in the overflow queue 610 is greater than zero. The processor 602 may be configured to add the obtained element to the standard queue 612 based additionally on a determination that the number of elements in the overflow queue 610 is zero. This may help ensure that the elements are processed in the order in which they are obtained. For example, if there are elements already waiting in the overflow queue 610, the processor 602 may not add a newly obtained element to the standard queue 612 as this would put the newly obtained element out of order with the elements that are already in the overflow queue 610. Instead, the processor 602 may add the newly obtained element to the overflow queue 610.

Figure 7:
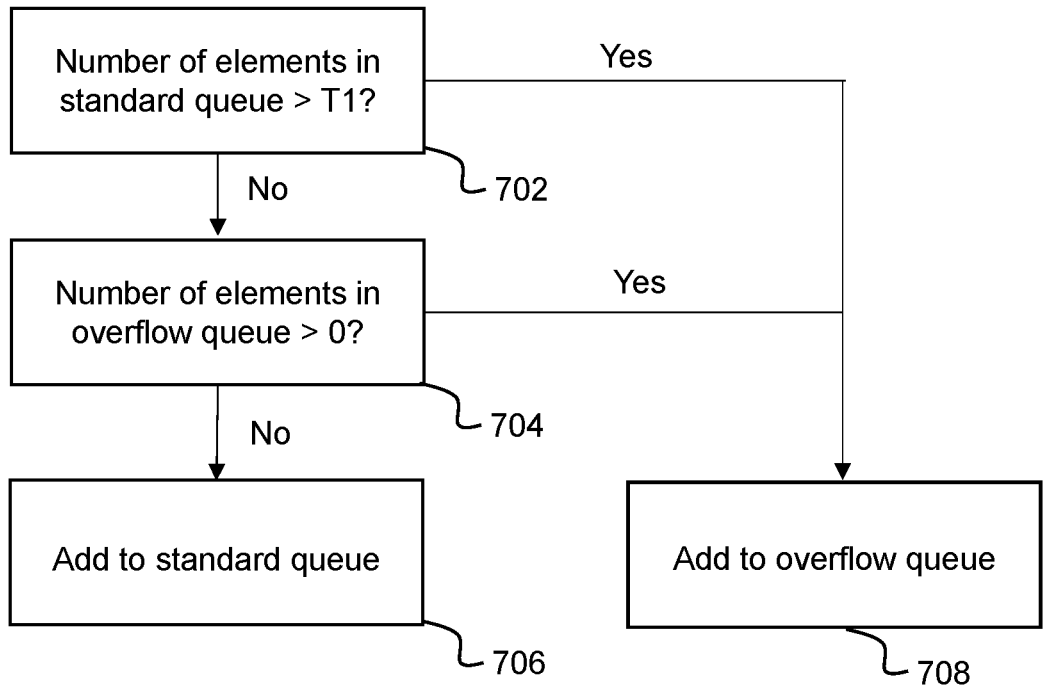
FIG. 7 illustrates a flow diagram of a process performed by a connector according to an example.

Referring to FIG. 7, there is illustrated a block diagram of the determinations that the processor 602 may make when a message is obtained for a particular standard queue 612, according to an example. At block 702, the processor 602 determines whether the number of elements in the standard queue 612 is greater than the first threshold T1. If the number of elements in the standard queue 612 is greater than the first threshold T1, then the processor 602 adds the element to the overflow queue 610 associated with the standard queue 612, as per block 708. If the number of elements in the standard queue 612 is not greater than the first threshold T1, then the processor 602 determines, as per block 704, whether the number of elements in the overflow queue 610 is greater than zero. If the number of elements in the overflow queue 610 is greater than zero, the processor 602 adds the element to the overflow queue as per block 708. If the number of elements in the overflow queue 610 is zero, the processor adds the element to the standard queue 706 as per block 706. As described above, this means that overrun of the standard queue 612 is avoided, the risk of blocking or deadlock associated with the standard queue is eliminated, and the elements are processed in the order in which they are obtained.

Figure 8:
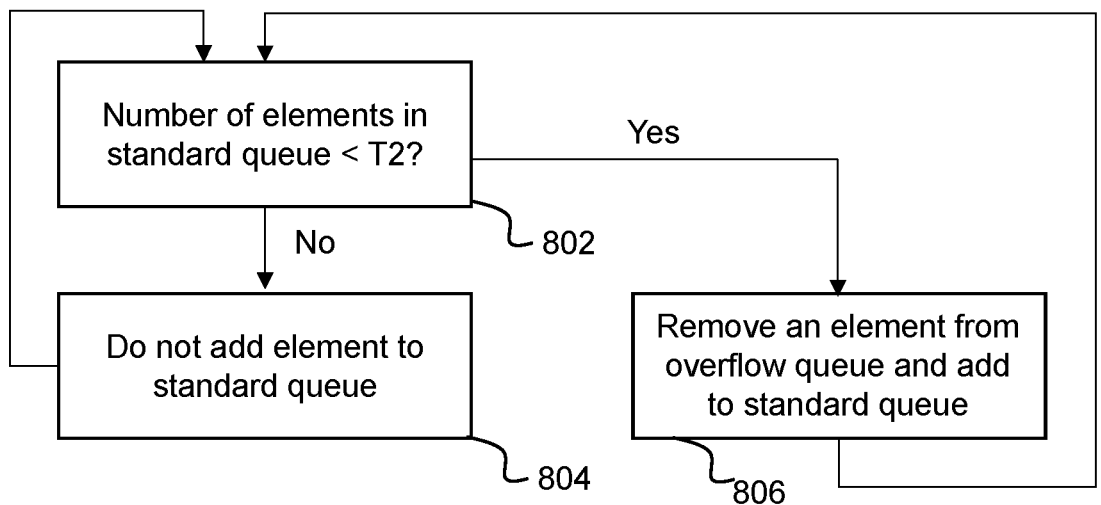
FIG. 8 illustrates a flow diagram of another process performed by a connector according to an example.

Referring to FIG. 8, there is illustrated a block diagram of the determinations that the processor 602 may make with respect to elements in the overflow queue 610, according to an example. For a particular overflow queue 610 that includes an element, at block 802, the processor 602 (specifically a worker thread thereof) determines whether the number of elements in the associated standard queue 612 is less than the second threshold T2. If the number of elements in the associated standard queue 612 is less than the second threshold T2, then the processor 602 removes an element from the overflow queue 610 and adds the removed element to the associated standard queue 610, as per block 806. If the number of elements in the associated standard queue 612 is not less than the second threshold T2, then the processor 602 does not add an element from the overflow queue 610 to the standard queue 612, but rather returns to block 802 where it is determined again whether the number of elements in the associated standard queue 612 is less than the second threshold T2.

Referring again to FIG. 6, in examples, the determinations of the processor 602 may be made with reference to an overflow flag 614. The overflow flag 614 is stored in the memory 604. The overflow flag 614 can either be set (for example, set to one of true and false) or reset (for example, set to the other of true and false). The overflow flag 614 is associated with the standard queue 612 and the overflow queue 610. In examples where there are multiple standard queues 612 and associated overflow queues 610 (not shown in FIG. 6), each standard queue 612 and associated overflow queue 610 may have a respective associated overflow flag 614. The overflow flag 614 may be used by the processor 602 to determine efficiently whether to add an obtained message to the standard queue 612 or the overflow queue 610.

Specifically, in examples, the processor 602 (specifically a worker thread thereof) may set the overflow flag 614 when the number of elements in the standard queue 612 is greater than the first threshold T1. The processor 602 may determine that the number of elements in the standard queue 612 is greater than the first threshold by determining that the overflow flag 614 is set. This provides an efficient way to implement the determination that the number of elements in the standard queue 612 is greater than the first threshold T1. If the processor 602 tests the overflow flag 614 and it is set, the processor 602 may directly add the obtained message to the overflow queue 612. This may be more computationally efficient than, for example, for every message, obtaining a count of the number of messages in the standard queue 610 and comparing this to the first threshold T1. On the other hand, the processor 602 may reset the overflow flag when the overflow queue 610 is determined to be empty (that is, when the number of elements in the overflow queue 610 is zero). The processor 602 may determine that the overflow queue 610 is empty (that is, that the number of elements in the overflow queue 610 is zero), and that the number of elements in the standard queue 612 is less than the first threshold T1, by determining that the overflow flag 614 is reset. This may provide an efficient way to implement the determination by the processor 602 that the number of messages in the standard queue 612 is less than the first threshold T1 and the overflow queue 612 is empty (that is, the number of elements in the overflow queue 610 is zero). If the processor 602 tests the overflow flag 614 and it is reset, the processor 602 may add the obtained elements to the standard queue 612. This may be more computationally efficient than, for example, for every element, making the respective determinations individually and/or explicitly.

As an example, a particular overflow flag 614 is associated with a particular standard queue 612 and overflow queue 610. The processor 602 (specifically a worker thread thereof) may obtain an elements, and check the overflow flag 614 to determine whether it is set. If the overflow flag 614 is set (for example, set to true), the processor 602 may add the element to the overflow queue 610. If the overflow flag 614 is reset (for example, set to false), the processor 602 may check a counter indicating the number of elements currently in the standard queue 612, and compare this number to the first threshold T1. If the processor 602 determines that the number of elements is not greater than the first threshold T1, the processor may add the element to the standard queue 612 and increment the counter by one. If the processor 602 determines that the number of elements is equal to the first threshold T1, the processor 602 may add the element to the standard queue 612, increment the counter by one, and set the overflow flag 614. At this point, the processor 602 may add further obtained elements directly to the overflow queue 612 as the overflow flag 614 is set. This may continue until the overflow flag 614 is reset (for example, set to false) again. Specifically, as described above, the processor 602 (specifically a worker thread thereof) waits until the number of elements in the standard queue 612 is less than the second threshold T2, at which point the processor 602 removes elements from the overflow queue 610 and adds the removed elements to the standard queue 612. This continues until the processor 602 removes the last element in the overflow queue 610. For example, the processor 602 may increment a counter for the overflow queue 610 by one every time an element is added to the overflow queue 610, and may decrement the counter by one every time a message is removed from the overflow queue 610. When the processor 602 determines that the number of elements in the overflow queue 610 is zero, the processor 602 resets the overflow flag 614 (for example, sets the overflow flag 614 to false). The processor 602 (specifically worker threads thereof) may then add further obtained elements to the standard queue 612 until again the number of elements in the standard queue 612 is greater than the first threshold T1, at which point the overflow flag 614 is again set.

In some situations, there is a risk that in between one worker thread checking the overflow flag 614 and adding the element to a queue, another worker thread may set or reset the flag. For example, in between one worker thread of the processor 602 checking the overflow flag 614, determining that it is set, and adding the element to the overflow queue 610, another worker thread may reset the overflow flag. This can risk the element being sent to the incorrect queue. In some examples, a lock may be used. For example, the processor 602 (specifically a worker thread thereof) may check the overflow flag 614, and if it is set (for example, set to true), the processor 602 may lock the overflow flag 614 and check the locked overflow flag 614. If the locked overflow flag 614 is set (for example, set to true), the processor 602 may add the obtained element to the overflow queue 610. If the locked overflow flag 614 is reset (for example, set to false), then the processor may add the obtained element to the standard queue 612. If the overflow flag 614 is reset (for example, set to false), the processor 602 may not lock the overflow flag 614 and instead add the obtained element directly to the standard queue. Accordingly, in 'normal' operation (that is, where the element is added directly to the standard queue 610), no lock is used, which may allow the check of the overflow flag 614 in 'normal' operation to be computationally inexpensive. Since the 'normal' operation may account for the majority of the overall operation of the processor 602, this may, in turn, allow the overall operation of the processor to be relatively computationally inexpensive, while still ensuring that the correct overflow flag 614 value is used.

VII. VARIATIONS

The system 600, the components thereof, and the operations of the components, described above with reference to FIG. 1 to FIG. 6 relate to illustrative examples. In other examples, variations may be made to the above examples.

For example, although in the above examples the system 600 of FIG. 6 is described as implementing the connector 204, 304 of FIG. 2 and FIG. 3, it will be appreciated that this need not necessarily be the case, and that in other examples, the system 600 may be used in other contexts. For example, the system 600 may be used with any standard queue 612, or more generally buffer, such as may be used by a computing device.

As another example, although in the above examples reference is made to the standard queue 612 and/or the overflow queue 610, it will be appreciated that these need not necessarily be queues, and may, more generally, be first and second buffers, respectively. A buffer may be a portion of memory that is used to hold elements for processing.

As another example, it will be appreciated that the elements obtained by the processor 602 and stored in the queues 610, 612 need not necessarily be messages and may, more generally, be elements, such as data elements. For example, for a particular first buffer, the elements may be one of messages, references to messages, references to queues of one or more messages, and references to queues of references to one or more messages. Further, it will be appreciated that the elements need not necessarily relate to messages at all, and may, in some examples be any elements, such as data elements. For example, the first buffer may store a number of elements and may have capacity for a certain number of elements. For example, the buffer may have a certain number of spaces, and one element may fill one space in the buffer. For example, each element may be of a fixed size. Other variations are possible, and it will be appreciated that, in some examples, the system 600 may include more or fewer components than described in the examples above.

Accordingly, it will be appreciated that, in examples, there is provided a system 600 including: a memory 604 configured to provide: a first buffer 612 for storing a number of elements for processing; and a second buffer 610 for storing elements for adding to the first buffer 612; and at least one processor 602 configured to: obtain an element to be processed; determine that the number of elements in the first buffer 612 is greater than a first threshold T1; and add the obtained element to the second buffer 610.

VIII. EXAMPLE METHODS

Figure 9:
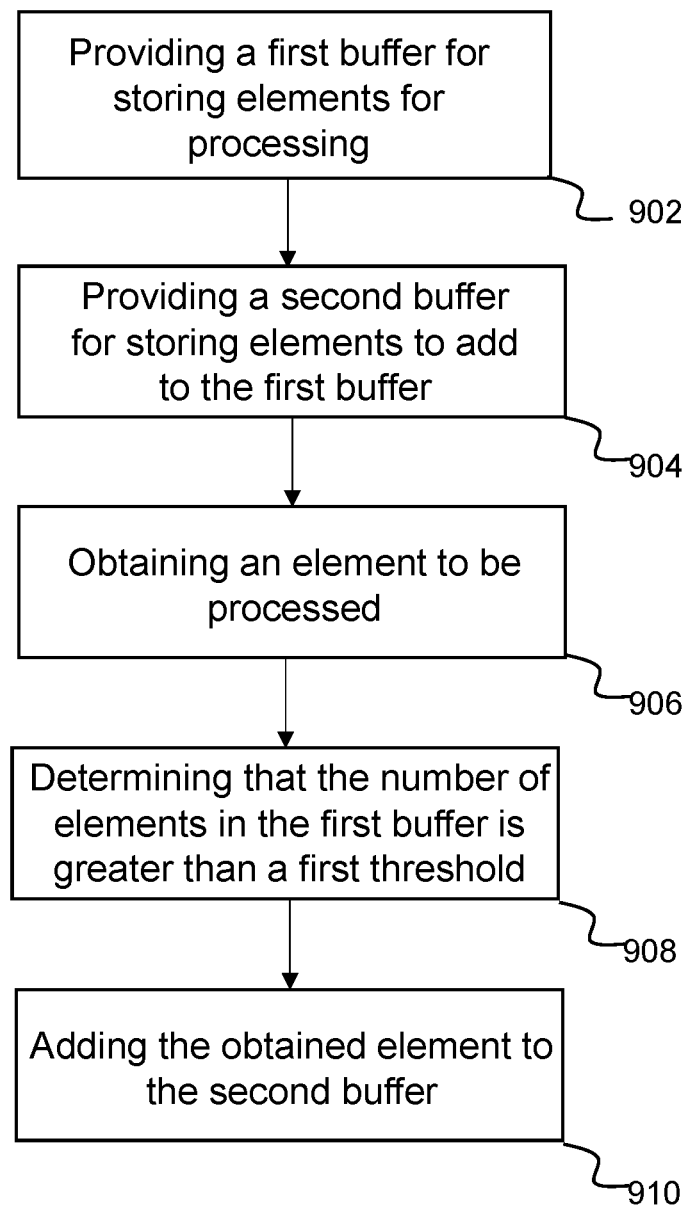
FIG. 9 illustrates a flow diagram of a method performed by a connector according to an example.

Referring to FIG. 9, there is a flow diagram illustrating a method according to an example. The method may be performed by a server system, for example, the system 600 according to any of the examples described above with reference to FIG. 1 to FIG. 8. For example, the method may be performed by the connector 204, 304 according to any of the examples described above with reference to FIG. 1 to FIG. 8. In examples, the server system includes at least one processor (for example, the processor 112, 206, 306, 602 according to any of the examples described above with reference to FIG. 1 to FIG. 8) and a memory (for example, the memory 114, 208, 308, 604 according to any of the examples described above with reference to FIG. 1 to FIG. 8). Aspects of the method may be performed by the at least one processor. The at least one processor may be configured to perform aspects of the method. The memory may store instructions which, when executed, cause the at least one processor to perform aspects of the method, or functions defined by the method. For example, the memory may store an application (for example, the application 130 of FIG. 1) including the instructions.

The method includes, in step 902, providing, in a memory, a first buffer for storing a number of elements for processing. For example, the memory may be the memory 604, the first buffer may be the standard queue 612, and the elements may be messages, according to any of the examples described above with reference to FIG. 1 to FIG. 8.

The method includes, in step 904, providing, in the memory, a second buffer for storing elements for adding to the first buffer. For example, the second buffer may be the overflow queue 610 according to any of the examples described above with reference to FIG. 1 to FIG. 8.

The method includes, in step 906, by at least one processor, obtaining an element to be processed. For example, the at least one processor may include the processor 602 according to any of the examples described above with reference to FIG. 1 to FIG. 8.

The method includes, in step 908, by the at least one processor, determining that the number of elements in the first buffer is greater than a first threshold. For example, the first threshold may be the first threshold T1 according to any of the examples described above with reference to FIG. 1 to FIG. 8.

The method includes, in step 910, by the at least one processor, adding the obtained element to the second buffer. That is, responsive to the determination the number of elements in the first buffer is greater than the first threshold, adding the obtained element to the second buffer.

IX. EXAMPLE ELECTRONIC TRADING SYSTEM

Figure 10:
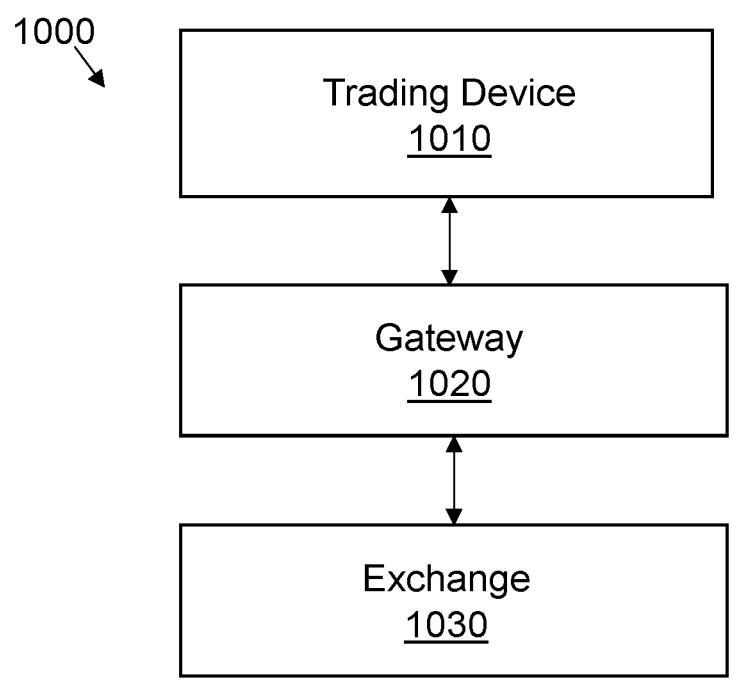
FIG. 10 illustrates a block diagram of an example electronic trading system in which certain embodiments may be employed.

FIG. 10 illustrates a block diagram representative of an example electronic trading system 1000 in which certain embodiments may be employed. The system 1000 includes a trading device 1010, a gateway 1020, and an exchange 1030. The trading device 1010 is in communication with the gateway 1020. The gateway 1020 is in communication with the exchange 1030. As used herein, the phrase "in communication with" encompasses direct communication and/or indirect communication through one or more intermediary components. The trading device 1010, the gateway 1020 and/or the exchange 1030 may include one or more computing devices 100 of FIG. 1. The exemplary electronic trading system 1000 depicted in FIG. 10 may be in communication with additional components, subsystems, and elements to provide additional functionality and capabilities without departing from the teaching and disclosure provided herein.

In operation, the trading device 1010 may receive market data from the exchange 1030 through the gateway 1020. The trading device 1010 may send messages to the exchange 1030 through the gateway 1020. A user may utilize the trading device 1010 to monitor the market data and/or base a decision to send an order message to buy or sell one or more tradeable objects to the exchange 1030. The trading device 1010 may use the market data to take trade actions such as to send an order message to the exchange 1030. For example, the trading device may run an algorithm that uses the market data as input and outputs trade actions, such as to send an order message to the exchange 1030. The algorithm may or may not require input from a user in order to take the trade actions.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 1010 may include one or more electronic computing platforms. For example, the trading device 1010 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 1010 may include a single or multi-core processor in communication with a memory or other storage medium configured to accessibly store one or more computer programs, applications, libraries, computer readable instructions, and the like, for execution by the processor.

By way of example, the trading device 1010 may include a computing device, such as a personal computer or mobile device, in communication with one or more servers, where collectively the computing device and the one or more servers are the trading device 1010. For example, the trading device 1010 may be a computing device and one or more servers together running TT® Platform, an electronic trading platform provided by Trading Technologies International, Inc. of Chicago Illinois ("Trading Technologies"). For example, the one or more servers may run one part of the TT platform, such as a part providing a web server, and the computing device may run another part of the TT platform, such as a part providing a user interface function on a web browser. The computing device and the server may communicate with one another, for example using browser session requests and responses or web sockets, to implement the TT platform. As another example, the trading device 1010 may include a computing device, such as a personal computer or mobile device, running an application such as TT® Desktop or TT® Mobile, which are both electronic trading applications also provided by Trading Technologies. As another example, the trading device 1010 may be one or more servers running trading tools such as ADL®, AUTOSPREADER®, AUTOTRADER™, and/or MD TRADER®, also provided by Trading Technologies.

The trading device 1010 may be controlled or otherwise used by a user. As used herein, the phrase "user" may include, but is not limited to, a human (for example, a trader), trading group (for example, a group of traders), or an electronic trading device (for example, an algorithmic trading system). One or more users may be involved in the control or other use of the trading device.

The trading device 1010 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 1010 from another computer readable medium. For example, the trading application (or updates to the trading application) may be stored by a manufacturer, developer, or publisher on one or more CDs, DVDs, or USB drives, which are then loaded onto the trading device 1010 or to a server from which the trading device 1010 retrieves the trading application. As another example, the trading device 1010 may receive the trading application (or updates to the trading application) from a server, for example, via the Internet or an internal network. The trading device 1010 may receive the trading application or updates when requested by the trading device 1010 (for example, "pull distribution") and/or un-requested by the trading device 1010 (for example, "push distribution").

The trading device 1010 may be adapted to send order messages. For example, the order messages may be sent to through the gateway 1020 to the exchange 1030. As another example, the trading device 1010 may be adapted to send order messages to a simulated exchange in a simulation environment which does not effectuate real-world trades.

The order messages may be sent at the request of a user. For example, a trader may utilize the trading device 1010 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 1010 to the exchange 1030 through the gateway 1020. The trading device 1010 may communicate with the gateway 1020 using a local area network, a wide area network, a multicast network, a wireless network, a virtual private network, an internal network, a cellular network, a peer-to-peer network, a point-of-presence, a dedicated line, the Internet, a shared memory system and/or a proprietary network.

The gateway 1020 may include one or more electronic computing platforms. For example, the gateway 1020 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 1020 facilitates communication. For example, the gateway 1020 may perform protocol translation for data communicated between the trading device 1010 and the exchange 1030. The gateway 1020 may process an order message received from the trading device 1010 into a data format understood by the exchange 1030, for example. Similarly, the gateway 1020 may transform market data in an exchange-specific format received from the exchange 1030 into a format understood by the trading device 1010, for example. As described in more detail below with reference to FIG. 11, in some examples, the gateway 1020 may be in communication with cloud services, which may support functions of the gateway 1020 and/or the trading device 1010.

The gateway 1020 may include a trading application, similar to the trading applications discussed above, that facilitates or improves electronic trading. For example, the gateway 1020 may include a trading application that tracks orders from the trading device 1010 and updates the status of the order based on fill confirmations received from the exchange 1030. As another example, the gateway 1020 may include a trading application that coalesces market data from the exchange 1030 and provides it to the trading device 1010. In yet another example, the gateway 1020 may include a trading application that provides risk processing, calculates implieds, handles order processing, handles market data processing, or a combination thereof.

In certain embodiments, the gateway 1020 communicates with the exchange 1030 using a local area network, a wide area network, a multicast network, a wireless network, a virtual private network, an internal network, a cellular network, a peer-to-peer network, a point-of-presence, a dedicated line, the Internet, a shared memory system, and/or a proprietary network.

The exchange 1030 may be owned, operated, controlled, or used by an exchange entity. Example exchange entities include the CME Group, the Chicago Board Options Exchange, the Intercontinental Exchange, and the Singapore Exchange. The exchange 1030 may be an electronic exchange that includes an electronic matching system, such as a computer, server, or other computing device, which is adapted to allow tradeable objects, for example, offered for trading by the exchange, to be bought and sold. The exchange 1030 may include separate entities, some of which list and/or administer tradeable objects and others which receive and match orders, for example. The exchange 1030 may include an electronic communication network ("ECN"), for example.

The exchange 1030 is adapted to receive order messages and match contra-side trade orders to buy and sell tradeable objects. Unmatched trade orders may be listed for trading by the exchange 1030. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 1010 or other devices in communication with the exchange 1030, for example. For example, typically the exchange 1030 will be in communication with a variety of other trading devices (which may be similar to trading device 1010) which also provide trade orders to be matched.

The exchange 1030 is adapted to provide market data. Market data may be provided in one or more messages or data packets or through a shared memory system. For example, the exchange 1030 may publish a data feed to subscribing devices, such as the trading device 1010 or gateway 1020. The data feed may include market data.

The system 1000 may include additional, different, or fewer components. For example, the system 1000 may include multiple trading devices, gateways, and/or exchanges. In another example, the system 1000 may include other communication devices, such as middleware, firewalls, hubs, switches, routers, servers, exchange-specific communication equipment, modems, security managers, and/or encryption/decryption devices.

In examples, the trading device 1010 may be provided by a client device 202a, 202b, 302a, 302b according to any of the examples described above with reference to FIG. 1 to FIG. 9. For example, the trading device 1010 may be configured to provide the same or similar functionality as the client device 202a, 202b, 302a, 302b according to any of the examples described above with reference to FIG. 1 to FIG. 9. In examples, the exchange 1030 may be provided by a host 210, 310 according to any of the examples described above with reference to FIG. 1 of FIG. 9. For example, the exchange 1030 may be configured to provide the same or similar functionality as the host 210, 310 according to any of the examples described above with reference to FIG. 1 to FIG. 9. In examples, the gateway 1020 may be provided by or include the system 600 and/or the connector 204, 304 of any of the examples described above with reference to FIG. 1 to FIG. 9. For example, the gateway 1010 may be configured to provide the same or similar functionality as the system 600 and/or the connector 204, 304 according to any of the examples described above with reference to FIG. 1 to FIG. 9.

In examples, the messages referred to above with reference to FIG. 1 to FIG. 9 may include the trade orders sent from the trading device 1010 to the exchange 1030 via the gateway 1020. For example, the gateway 1020 may receive an (outbound) trade order from a trading device 1010, and the gateway 1020 may add the trade order to a standard queue or an overflow queue, for example as described above with reference to FIG. 1 to FIG. 9. The gateway 1020 may process the trade order by translating the trade order into a format understood by the exchange 1030.

In examples, the messages referred to above with reference to FIG. 1 to FIG. 9 may include execution reports sent from the exchange 1030 to the trading device 1010 via the gateway 1020 when the trade order is executed at the exchange 1030. For example, the gateway 1020 may receive an (inbound) execution report from the exchange 1030, and the gateway 1020 may add the execution report to a standard queue or an overflow queue, for example as described above with reference to FIG. 1 to FIG. 9. The gateway 1020 may process the execution report by translating the execution report into a format understood by the trading device 1010.

In some examples, the action performed by the host referred to above with reference to FIG. 1 to FIG. 9 may include the exchange 1030 performing an action with respect to a particular working order. For example, the trading device 1010 may send a trade order to the exchange 1030 via the gateway 1020. The trade order may include an order ID indicating the specific working order with which the trade order is associated. All trade orders from the trading device 1010 that relate to the same working order may include the same order ID. The exchange 1030 may carry out the received trade order (such as placing, changing and/or cancelling the order). The exchange 1030 may then send an execution report back to the trading device 1010 via the gateway 1020. For example, the execution report may detail the result of the trade order. Again, each execution report may include the order ID indicating the specific working order with which the execution report is associated. In these examples, each action queue 406, 408, 416, 418 referred to above with reference to FIG. 1 to FIG. 9 may be a respective order queue. That is, each order queue 406, 408, 416, 418 may be associated with a particular working order, and messages in a particular order queue 406, 408, 416, 418 may all have the same order ID. It can be important that trade orders relating to a particular working order are processed in the order in which they are received by the gateway 1020, as if they are received out of order at the exchange 1030, the exchange 1030 may not execute the trade orders correctly.

In examples, the messages referred to above with reference to FIG. 1 to FIG. 9 may include protocol messages between the trading device 1010 and the exchange 1030. For example, the trading device 1010 (or an application running thereon) and the exchange 1030 may communicate with one another using Financial Information Exchange (FIX) messages. Some of these messages may relate to the establishment or maintenance of the FIX connection or session. For example, the messages may include heartbeat messages, which are sent from the exchange 1030 to the trading device 1010 (and/or from the trading device 1010 to the exchange 1030) in order to confirm that the trading device 1010 (and/or the exchange 1030) is still present on the connection and hence that the connection should be maintained.

X. SPECIFIC EXAMPLE ELECTRONIC TRADING SYSTEM

Figure 11:
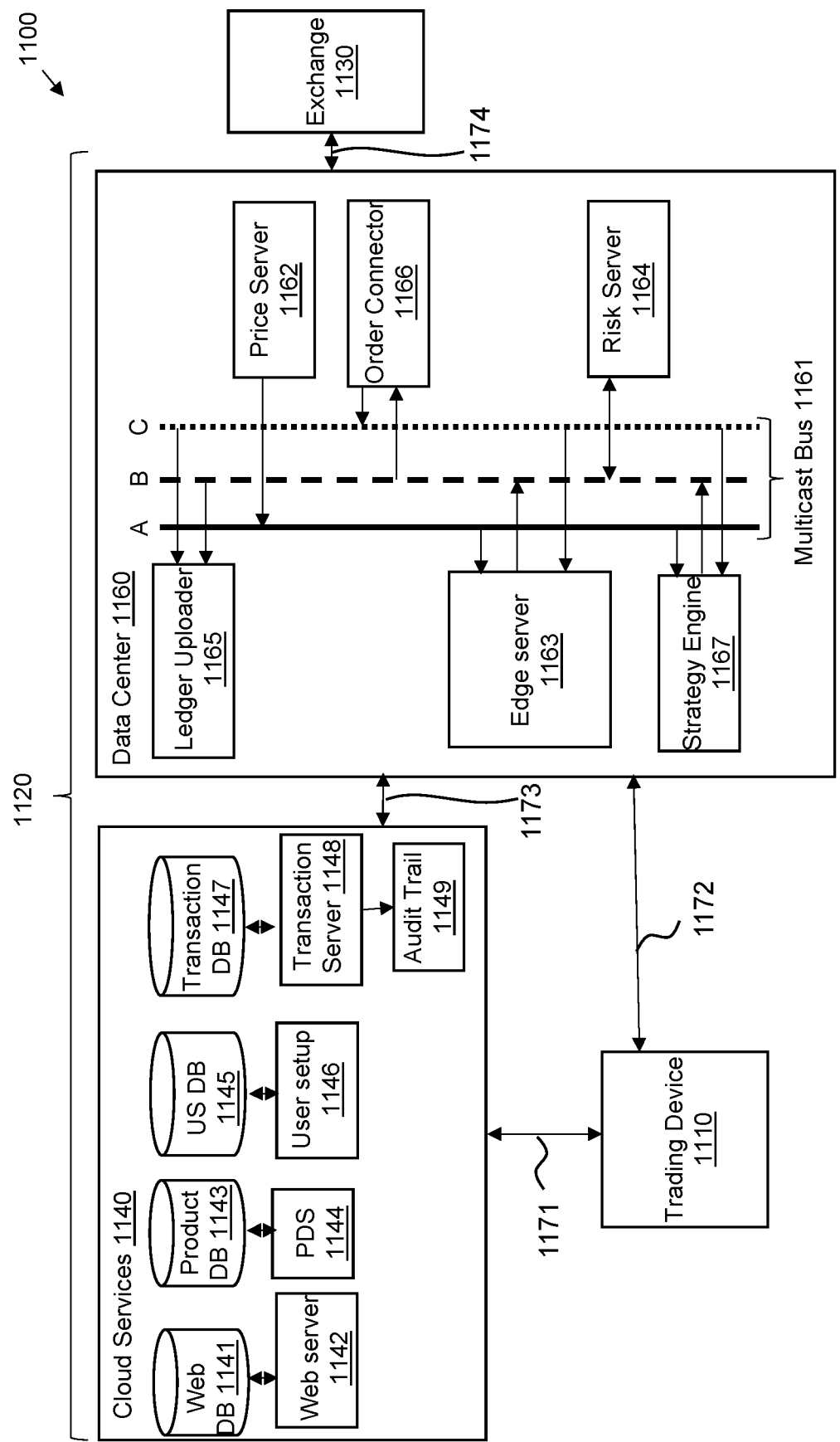
FIG. 11 illustrates a block diagram of another example electronic trading system in which certain embodiments may be employed.

FIG. 11 illustrates a block diagram representative of an example electronic trading system 1100 in which certain embodiments may be employed. The electronic trading system 1100 includes a trading device 1110, a hybrid cloud system 1120, and an exchange 1130. The trading device 1110 may be the same or similar to the trading device 1010 described above with reference to FIG. 10. The exchange 1130 may be the same or similar to the exchange 1030 described above with reference to FIG. 10. The hybrid cloud system 1120, or one or more components thereof, may provide one or more of the functions of the gateway 1020 described above with reference to FIG. 10. That is, the functionality of the gateway 1020 described above with reference to FIG. 10, or one or more parts of that functionality, may be included within the hybrid cloud system 1120.

The hybrid cloud system 1120 includes cloud services 1140 and data center 1160. In the example illustrated in FIG. 11, the cloud services 1140 and the components thereof are separate from the data center 1160. However, in other examples (not shown), one or more or all of the components and/or functions of the cloud services 1140 may instead be implemented in the data center 1160. In such examples, or otherwise, the electronic trading system 1100 may not include the cloud services 1140. In such examples, one or more of the functions of the gateway 1020 described above with reference to FIG. 10 may be provided by the data center 1160, or one or more components thereof, alone.

In order to provide lower latency for time sensitive processes, the data center 1160 may be co-located with the exchange 1130 or located in proximity to the exchange 1130. Accordingly, functions of the hybrid cloud system 1120 that are time sensitive or otherwise benefit from a lower latency with the exchange 1130, may be carried out by the data center 1160. In general, functions of the hybrid cloud system 1120 that are not time sensitive or do not benefit from lower latency with the exchange 1130, may be carried out by the cloud services 1140. The hybrid cloud system 1120 allows for the electronic trading system 1100 to be scalable with respect to non-time critical functions while still providing relatively low latency with the exchange 1130.

In the example of FIG. 11, the trading device 1110 is in communication with the cloud services 1140 over a first network 1171. For example, the first network 1171 may be a wide area network such as the Internet using a hypertext transfer protocol (HTTP) connection. The trading device 1110 is in communication with the data center 1160 over a second network 1172. For example, the trading device 1110 may communicate with the data center 1160 over a virtual private network or using a secure web socket or a TCP connection. The first network 1171 and the second network 1172 may be the same network. The data center 1160 communicates with the cloud services 1140 over a third network 1173. For example, the data center 1160 may communicate with the cloud services 1140 over a private network or virtual private network (VPN) tunnel. The third network 1173 may be the same as the first network 1171 and/or the second network 1172. The data center 1160 communicates with the exchange 1130 over a fourth network 1174. For example, the data center 1160 may communicate with the exchange 1130 using a local area network, a wide area network, a multicast network, a wireless network, a virtual private network, an internal network, a cellular network, a peer-to-peer network, a point-of-presence, a dedicated line, the Internet, a shared memory system, and/or a proprietary network. The fourth network 1174 may be the same as the first network 1171, the second network 1172 and/or the third network 1173.

The cloud services 1140 may be implemented as a virtual private cloud, which may be provided by a logically isolated section of an overall web services cloud. In this example, the cloud services 1140 include a web database 1141 and associated web server 1142, a product database 1143 and associated product data server (PDS) 1144, a user setup database 1145 and associated user setup server 1146, and a transaction database 1147 and associated transaction server 1148.

The trading device 1110 may communicate with the web server 1142. As one example, the trading device 1110 may run a web browser, referred to in this disclosure as a browser, which establishes a browsing session with the web server 1142. This may occur after appropriate domain name resolution to an IP address of the cloud services 1140 and/or after appropriate authentication of the trading device 1110 (or user thereof) with the cloud services 1140. The browser sends requests to the web server 1142, and the web server 1142 provides responses to the browser, for example using the HyperText Transfer Protocol (HTTP) or the Secure HyperText Transfer Protocol (HTTPS) protocol. The web server 1142 may provide a user interface to the browser, via which a user can interact with the electronic trading platform. The user interface may allow market data to be displayed and/or allow trade orders to be placed. As another example, the trading device 1110 may run an application which communicates with the web server 1142, such as via an application programming interface (API), to allow a user to interact with the electronic trading platform. The application may provide a user interface via which a user can interact with the electronic trading platform.

The trading device 1110 may communicate with the PDS 1144. The PDS 1144 interfaces with the Product DB 1143. The Product DB 1143 stores definitions of instruments and permissions of users with respect to the instruments. Specifically, the Product DB 1143 stores definitions of tradeable objects, as well as permissions of users to place trade orders with respect to tradeable objects. This information may be provided to the trading device 1110. This information may be used by a user interface of the trading device 1110 to determine, for the given user of the trading device 1110, for which tradeable objects trade orders are allowed to be placed.

The trading device 1110 may communicate with the user setup server 1146. The user setup server 1146 interfaces with the user setup database 1145, which stores user's settings, preferences, and other information associated with the user's account. This information may be provided by the trading device 1110 to the user setup server 1146 on user registration, or at certain times after registration, and the user setup server 1146 may store this information in the user setup database 1145. This information may be provided to the trading device 1110. This information may be used by a user interface of the trading device 1110 to determine which market data is to be shown and in which format.

The transaction database 1147 stores information on transactions carried out using the electronic trading system 1100. The transaction database 1147 may store all of the trade orders submitted by users and all of the corresponding order execution reports provided by the exchange 1130 when the trade order is executed. The transaction server 1148 may interrogate the transaction database 1147 to produce an audit trail 1149, for example for a given user. This audit trail 1149 may be provided to the trading device 1110 (or another device) to allow inspection and/or analysis of the trading activity of a given user.

The data center 1160 includes a multicast bus 1161, a price server 1162, an edge server 1163, a risk server 1164, a ledger uploader server 1165, an order connector 1166, and a strategy engine server 1167. The various components within the data center 1160 communicate with one another using the multicast bus 1161. This allows for efficient and scalable communications between the components within the data center 1160. For example, information provided by one of the components may be received by multiple other of the components. Transmitting this information on a multicast bus 1161 to which the other components are subscribed allows for the information to be transmitted in one message, irrespective of how many components may receive the information.

The price server 1162 receives market data from the exchange 1130. The price server 1162 converts this information into a format and/or syntax associated with (for example, used by) the electronic trading system 1100. The price server 1162 transmits the converted information as one or more multicast messages on the multicast bus 1161. Specifically, the price server 1162 multicasts this information on a first multicast bus A, to be received by price clients. The edge server 1163 and the strategy engine server 1167 subscribe to the first multicast bus A and receive the market data from the price server 1162. The price server 1162 may communicate with the cloud services 1140. For example, the price server 1162 may provide information on products or tradeable objects to the PDS server 1144 for the PDS server 1144 to use in defining tradeable objects.

The edge server 1163 communicates with the trading device 1110. For example, the trading device 1110 may communicate with the edge server 1163 over a secure web socket or a TCP connection. In some examples, the edge server 1163 may be implemented as a server cluster. The number of servers in the cluster may be determined and scaled as necessary depending on utilization. The edge server 1163 receives market data over the first multicast bus A and routes the market data to the trading device 1110. A user of the trading device 1110 may decide to place a trade order based on the market data. The edge server 1163 routes trading orders from the trading device 1110 towards the exchange 1130. Specifically, when the edge server 1163 receives an order message from the trading device 1110, the edge server 1163 multicasts the order message (or at least a portion of the contents thereof) on a second multicast bus B, to be received by order clients. The risk server 1164 subscribes to the second multicast bus B and receives the order message from the edge server 1163.

The risk server 1164 is used to determine a pre-trade risk for a given trade order contained in a given order message. For example, for a given trade order, the risk server 1164 may determine whether or not the user placing the trade order is permitted to do so. The risk server 1164 may determine whether the user is permitted to trade the quantity of the tradeable object specified in the trade order. The risk server 1164 may prevent unauthorized trade orders being placed. The risk server 1164 receives the order message from the edge server 1163 over the second multicast bus B and processes the order message to determine a risk for the trade order of the message. If the risk server 1164 determines that the trade order should not be placed (for example, a risk associated with the trade order is over a threshold) the risk server 1164 prevents the trade order from being placed. For example, in this case, the risk server 1164 may not transmit the order message to the order connector 1166 and may instead transmit a message indicating to the user that the trade order was not placed. If the risk server 1164 determines that the trade order should be placed (for example, a risk associated with the trade order is below a threshold) the risk server 1164 forwards the order message to the order connector 1166. Specifically, the risk server 1164 multicasts the order message on the second multicast bus B. The order connector 1166 and the ledger uploader 1165 are subscribed to the second multicast bus B and receive the order message from the risk server 1164.

The ledger uploader server 1165 is in communication with the transaction database 1147 of the cloud services 1140. The ledger uploader server 1165 receives the order message from the risk server 1164 and transmits the order message to the transaction database 1147. The transaction database 1147 then stores the order message (or at least a portion of the contents thereof) in the ledger stored in the transaction database 1147.

The order connector 1166 is in communication with the exchange 1130. The order connector 1166 receives the order message from the risk server 1164, processes the order message for sending to the exchange 1130, and sends the processed order message to the exchange 1130. Specifically, the processing includes processing the order message into a data format understood by the exchange 1130. If the trade order within the order message is executed by the exchange 1130, the exchange 1130 sends a corresponding execution report message to the order connector 1166. The execution report message includes an execution report detailing the execution of the trade order. The order connector 1166 applies processing to the execution report message. Specifically, the processing includes processing the execution report message into a data format understood by the electronic trading system and the trading device 1110. The order connector 1166 multicasts the processed execution report message on a third multicast bus C for receipt by execution report clients. The edge server 1163 and the ledger uploader 1165 are subscribed to the third multicast bus C and receive the processed execution report message. The ledger uploader 1165 communicates with the transaction database 1147 to update the ledger with the execution report message (or at least a portion of the contents thereof). The edge server 1163 forwards the execution report message to the trading device 1110. The trading device 1110 may display information based on the execution report message to indicate that the trade order has been executed.

In some examples, order messages may be submitted by the strategy engine server 1167. For example, the strategy engine server 1167 may implement one or more strategy engines using an algorithmic strategy engine and/or an autospreader strategy engine. The strategy engine 1167 may receive market data (from the price server 1162 via the first multicast bus A) and automatically generate order messages on the basis of the market data and a suitably configured algorithm. The strategy engine server 1167 may transmit an order message to the order connector 1166 (via the risk server 1164 and the second multicast bus B), and the order connector 1166 processes the order message in the same way as described above. Similarly, when the exchange 1130 executes the order, the strategy engine 1167 may receive (via the third multicast bus C) a corresponding order execution report message from the order connector 1166. The order message and the execution report message may be transmitted to the ledger uploader 1165 in a similar way to as described above, in order for the ledger uploader 1165 to update the ledger stored by the transaction database 1147.

In some examples, the trade orders sent by the trading device 1110 may not be submitted by a person. For example, the trading device 11110 may be a computing device implementing an algorithmic trading application. In these examples, the trading device 1110 may not communicate with the web server 1142, PDS 1144, and/or the user setup server 1146, and may not utilize a browser or a user interface for submitting trades. The application running on the trading device 1110 may communicate with an adapter associated with the edge server 1163. For example, the application and the adapter may communicate with each other using Financial Information Exchange (FIX) messages. In these examples, the adapter may be a FIX adapter. The application running on the trading device 1110 may receive market data in a FIX format (the market data being provided by the price server 1162 and converted into the FIX format by the FIX adapter associated with the edge server 1163). The application running on the trading device 1110 may generate trade orders based on the received market data, and transmit order messages in a FIX format to the FIX adapter associated with the edge server 1163. The FIX adapter associated with the edge server 1163 may process the order messages received in the FIX format into a format understood by the components of the data center 1160.

It is to be understood that the electronic trading system 1100 is merely an example, and other electronic trading systems could be used. As one example, the electronic trading system 1100 need not necessarily include the cloud services 1140. As another example, the data center 1160 may include more or fewer components than described above with reference to FIG. 11. As another example, a form of messaging between components of the data center 1160 other than multicast messaging may be used.

In examples, the order connector 1166 may be provided by or include the system 600 and/or the connector 204, 304 of any of the examples described above with reference to FIG. 1 to FIG. 9. For example, the order connector 204, 304 may be configured to provide the same or similar functionality as the system 600 and/or the connector 204, 304 according to any of the examples described above with reference to FIG. 1 to FIG. 9. Accordingly, in examples, the server system 600 and/or the connector 204, 304 according to any of the examples described above with reference to FIG. 1 to FIG. 9 may implement the order connector 1166 of the example electronic trading system 1100 or electronic trading platform provided thereby. The trading device 1110 and/or the strategy engine 1167 may be provided by, and/or provide the same or similar functionality to, a client device 202a, 202b, 302a, 302b according to any of the examples described above with reference to FIG. 1 to FIG. 9. The exchange 1130 may be provided by, and/or provide the same or similar functionality to, a host 210, 310 according to any of the examples described above with reference to FIG. 1 to FIG. 9.

In examples, the order connector 1166 may receive a message, such as a trade order or a protocol message, from the trading device 1100 (or the strategy engine 1167). The order connector 1166 may then add the message to a standard queue or an overflow queue, as described above. In the case of trade order messages, the order connector 1166 may process the message by translating the message into a format that is understood by the exchange 1130 and send the translated message to the exchange 1130. In the case of protocol messages, such as FIX heartbeat messages, the order connector 1166 may forward the message to the exchange 1130, as needed. The exchange 1130 may process the message. For example, in the case of a trade order message, the exchange 1130 may carry out the trade order. The exchange may then send an execution report back towards the trading device 1100. In the case of a protocol message the exchange 1130 may process the protocol message and send a response protocol message, as needed, back towards the trading device 1100. The order connector 1166 may receive the message from the exchange 1130 and add the message to a standard queue or an overflow queue, as described above. In the case of an execution report message, the order connector 1166 may process the message by translating the message into a format that is understood by the trading device 1100 (or strategy engine 1167) and send the translated message to the trading device 1100 (or strategy engine 1167). In the case of protocol messages, the order connector 1166 may forward the message to the trading device 1100 (or strategy engine 1167), as needed.

As a particular example, the trading device 1100 (or the strategy engine 1167) may send a trade order message relating to a particular working order to the order connector 1166. The order connector 1166 may add the trade order message for the particular working order to an outbound session queue associated with the session between the trading device 1100 and the exchange 1130 (or an overflow queue associated with the outbound session queue, as appropriate). The order connector 1116 may then add a reference to the session queue to a worker queue (or an overflow queue associated with the worker queue, as appropriate). The order connector 1166 may then remove the trade order message from the referenced session queue and determine the particular working order to which the trade order message relates (for example by reference to the order ID included in the message), and add the trade order message to the outbound order queue associated with the particular working order (or an overflow queue associated with the outbound order queue, as appropriate). The order connector 116 may then add a reference to the order queue to the worker queue (or an overflow queue associated with the worker queue, as appropriate). The order connector may then remove the trade order message from the referenced order queue and process the trade order message by translating the trade order message into a format understood by the exchange 1130 and sending the translated trade order message to the exchange 1130.

The exchange 1130 may process the trade order and send an execution report relating to the particular working order in response. The order connector 1166 may add the execution report message to an inbound session queue associated with the session between the trading device 1100 and the exchange 1130 (or an overflow queue associated with the inbound session queue, as appropriate). The order connector 1116 may then add a reference to the inbound session queue to a worker queue (or an overflow queue associated with the worker queue, as appropriate). The order connector 1166 may then remove the execution report message from referenced inbound session queue and determine the particular working order to which the execution report message relates (for example by reference to the order ID included in the message), and add the execution report message to an inbound order queue associated with the particular working order (or an overflow queue associated with the outbound order queue, as appropriate). The order connector 116 may then add a reference to the inbound order queue to the worker queue (or an overflow queue associated with the worker queue, as appropriate). The order connector 1166 may then process the execution report message from the referenced inbound order queue by translating the execution report message into a format understood by the trading device 1100 (or strategy engine 1167) and send the translated execution report to the trading device 1100 (or strategy engine 1167). The trading device 1100 (or strategy engine 1167) may process the execution report as appropriate.

Accordingly, messages on different sessions (that is, associated with different trading devices 1100) may be processed concurrently by the order connector 1166. Moreover, messages relating to different working orders (whether in the same session or between sessions) may be processed concurrently by the order connector 1166. This may allow for the order connector 1166 to process messages quickly. Moreover, since each queue has an associated overflow queue, then even if there is a burst of messages such that any one of the standard queues is at or approaches its capacity, messages (or more generally, elements) can still be added to the associated overflow queue. Accordingly, process blocking and/or deadlock can be avoided. This may prevent process blocking and/or deadlock affecting the rate of processing by the order connector 1166. This may help the order connector 1166 to operate at higher overall speeds and/or more consistently. Moreover, a burst of messages on a particular session (that is, for a particular trading device 1100) will not affect the rate of processing at the order connector 1166 of messages on a different session. Rather, the burst of messages will be added to the standard queue or the overflow queue, as appropriate, for the particular session. This may allow for the order connector 1166 to operate consistently across sessions. Accordingly, the order connector 1166 may protect the processing of messages on one session (that is, for a particular trading device 1100 or strategy engine 1167) from interference by bursts of messages on another session (that is, for another trading device 1100 or strategy engine 1167). Improved order connector 1166 operation may therefore be provided.

As used herein, the phrases "configured to" and "adapted to" encompass that an element, structure, or device has been modified, arranged, changed, or varied to perform a specific function or for a specific purpose.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example. The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made, and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

Clauses

1. A system including: a memory configured to provide: a first buffer for storing a number of elements for processing; and a second buffer for storing elements for adding to the first buffer; and at least one processor configured to: obtain an element to be processed; determine that the number of elements in the first buffer is greater than a first threshold; and add the obtained element to the second buffer.

2. The system of clause 1, wherein the at least one processor is further configured to: based at least in part on a determination that the number of elements in the first buffer is less than the first threshold, add the obtained element to the first buffer.

3. The system of clause 1 or clause 2, wherein the at least one processor is configured to: set an overflow flag when the number of elements in the first buffer is greater than the first threshold; and wherein the at least one processor is configured to determine that the number of elements in the first buffer is greater than the first threshold by determining that the overflow flag is set.

4. The system of any one of clause 1 to clause 3, wherein the at least one processor is further configured to: determine that the number of elements in the first buffer is less than a second threshold, wherein the second threshold is lower than the first threshold; and remove an element from the second buffer and add the removed element to the first buffer.

5. The system of any one of clause 1 to clause 4, wherein the first buffer is a first queue for queuing a number of elements for processing, and the second buffer is a second queue for queuing elements for adding to the first queue.

6. The system of any one of clause 1 to clause 5, wherein the at least one processor is further configured to: determine that a number of elements in the second buffer is greater than zero; and add the obtained element to the second buffer.

7. The system of any one of clause 1 to clause 6, wherein the at least one processor is further configured to: determine that the second buffer is empty and that the number of elements in the first buffer is less than the first threshold; and add the obtained element to the first buffer.

8. The system of clause 7, wherein the at least one processor is configured to: set an overflow flag when the number of elements in the first buffer is greater than the first threshold; and reset the overflow flag when the second buffer is determined to be empty, wherein the at least one processor is configured to determine that the second buffer is empty and the number of elements in the first buffer is less than the first threshold by determining that the overflow flag is reset.

9. The system of any one of clause 1 to clause 8, wherein the first buffer is a ring buffer.

10. The system of any one of clause 1 to clause 9, wherein the second buffer is a queue for queuing elements for adding to the first buffer.

11. The system of any one of clause 1 to clause 10, wherein the at least one processor is configured to implement a number of worker threads that add to the first buffer, wherein the first threshold is at most the total number of elements for which the first buffer has capacity less the number of worker threads.

12. The system of any one of clause 1 to clause 11, wherein the elements are messages, and the at least one processor is configured to obtain the element by receiving a message from an external entity via a communications interface.

13. The system of any one of clause 1 to clause 11, wherein the at least one processor is configured to obtain the element by removing an element from a third buffer.

14. The system of any one of clause 1 to clause 13, wherein the elements are each a reference to a queue of one or more messages.

15. The system of any one of clause 1 to clause 14, wherein the elements relate to messages, wherein the system includes a server system including the at least one processor and the memory, and the server system is configured to facilitate messaging between a host system and one or more client systems.

16. The system of clause 15, wherein one or more of the client systems include a trading device and the host system includes an electronic exchange.

17. The system of clause 15 or clause 16, wherein the server system is configured to establish a plurality of connections between the host system and a respective plurality of client systems, wherein the memory is configured to provide a first buffer and an associated second buffer for each of the plurality of connections, and wherein the at least one processor is configured to, for at least some of the connections, add elements to the respective first buffer or second buffer for that connection.

18. The system of any one of clause 15 to clause 17, wherein the messaging between the host system and the one or more client systems is bi-directional, wherein the memory is configured to provide a first buffer and an associated second buffer for each of a first messaging direction and a second messaging direction, and wherein the at least one processor is configured to, for each messaging direction, add elements to the respective first buffer or second buffer for that direction.

19. The system of any one of clause 15 to clause 18, wherein the server system includes an order connector of an electronic trading platform, and the order connector incudes the at least one processor and the memory.

20. A method including: providing, in a memory: a first buffer for storing a number of elements for processing; and a second buffer for storing elements for adding to the first buffer; and by at least one processor: obtaining an element to be processed; determining that the number of elements in the first buffer is greater than a first threshold; and adding the obtained element to the second buffer.

21. The method of clause 20, wherein the method further comprises, by the at least one processor: based at least in part on a determination that the number of elements in the first buffer is less than the first threshold, adding the obtained element to the first buffer.

22. The method of clause 20 or clause 21, wherein method comprises, by the at least one processor: setting an overflow flag when the number of elements in the first buffer is greater than the first threshold; and wherein determining that the number of elements in the first buffer is greater than the first threshold is by determining that the overflow flag is set.

23. The method of any one of clause 20 to clause 22, wherein the method further comprises, by the at least one processor: determining that the number of elements in the first buffer is less than a second threshold, wherein the second threshold is lower than the first threshold; and removing an element from the second buffer and adding the removed element to the first buffer.

24. The method of any one of clause 20 to clause 23, wherein the first buffer is a first queue for queuing a number of elements for processing, and the second buffer is a second queue for queuing elements for adding to the first queue.

25. The method of any one of clause 20 to clause 24, wherein the method further comprises, by the at least one processor: determining that a number of elements in the second buffer is greater than zero; and adding the obtained element to the second buffer.

26. The method of any one of clause 20 to clause 25, wherein the method further comprises, by the at least one processor: determining that the second buffer is empty and that the number of elements in the first buffer is less than the first threshold; and adding the obtained element to the first buffer.

27. The method of clause 26, wherein the method further comprises, by the at least one processor: setting an overflow flag when the number of elements in the first buffer is greater than the first threshold; and resetting the overflow flag when the second buffer is determined to be empty, wherein determining that the second buffer is empty and the number of elements in the first buffer is less than the first threshold is by determining that the overflow flag is reset.

28. The method of any one of clause 20 to clause 27, wherein the first buffer is a ring buffer.

29. The method of any one of clause 20 to clause 28, wherein the second buffer is a queue for queuing elements for adding to the first buffer.

30. The method of any one of clause 20 to clause 29, wherein the method comprises, by the at least one processor: providing a number of worker threads that add to the first buffer, wherein the first threshold is at most the total number of elements for which the first buffer has capacity less the number of worker threads.

31. The method of any one of clause 20 to clause 30, wherein the elements are messages, and wherein obtaining the element is by receiving a message from an external entity via a communications interface.

32. The method of any one of clause 20 to clause 30, wherein obtaining the element is by removing an element from a third buffer.

33. The method of any one of clause 20 to clause 32, wherein the elements are each references to a queue of one or more messages.

34. The method of any one of clause 20 to clause 33, wherein the elements relate to messages, wherein the method is performed by a server system including the at least one processor and the memory, and wherein the method comprises, by the at least one processor: facilitating messaging between a host system and one or more client systems.

35. The method of clause 34, wherein one or more of the client systems include a trading device and the host system includes an electronic exchange.

36. The method of clause 34 or clause 35, wherein the method further comprises establishing a plurality of connections between the host system and a respective plurality of client systems; providing, in the memory, a first buffer and an associated second buffer for each of the plurality of connections; and, for at least some of the connections, by the at least one processor: adding elements to the respective first buffer or second buffer for that connection.

37. The method of any one of clause 34 to clause 36, wherein the messaging between the host system and the one or more client systems is bi-directional, wherein the method further comprises: providing a first buffer and an associated second buffer for each of a first messaging direction and a second messaging direction; and, by the at least one processor, for each messaging direction, adding elements to the respective first buffer or second buffer for that direction.

38. The method of any one of clause 34 to clause 37, wherein the memory and the at least one processor are part of an order connector of an electronic trading platform.

39. A tangible computer readable medium comprising instructions which, when executed, cause a machine to at least: provide, in a memory: a first buffer for storing elements for processing; and a second buffer for storing elements for adding to the first buffer; and by at least one processor: obtain an element to be processed; determine that the number of elements in the first buffer is greater than a first threshold; and add the obtained element to the second buffer.

40. The tangible computer readable medium of clause 39, wherein the instructions, when executed, cause the machine to: by the at least one processor: based at least in part on a determination that the number of elements in the first buffer is less than the first threshold, add the obtained element to the first buffer.

41. The tangible computer readable medium of clause 39 or clause 40, wherein the instructions, when executed, cause the machine to: by the at least one processor: set an overflow flag when the number of elements in the first buffer is greater than the first threshold; and wherein the determination that the number of elements in the first buffer is greater than the first threshold is by determining that the overflow flag is set.

42. The tangible computer readable medium of any one of clause 39 to clause 41, wherein the instructions, when executed, cause the machine to: by the at least one processor: determine that the number of elements in the first buffer is less than a second threshold, wherein the second threshold is lower than the first threshold; and remove an element from the second buffer and add the removed element to the first buffer.

43. The tangible computer readable medium of any one of clause 39 to clause 42, wherein the first buffer is a first queue for queuing a number of elements for processing, and the second buffer is a second queue for queuing elements for adding to the first queue.

44. The tangible computer readable medium of any one of clause 39 to clause 43, wherein the instructions, when executed, cause the machine to: by the at least one processor: determine that a number of elements in the second buffer is greater than zero; and add the obtained element to the second buffer.

45. The tangible computer readable medium of any one of clause 39 to clause 44, wherein the instructions, when executed, cause the machine to: by the at least one processor: determine that the second buffer is empty and that the number of elements in the first buffer is less than the first threshold; and add the obtained element to the first buffer.

46. The tangible computer readable medium of clause 45, wherein the wherein the instructions, when executed, cause the machine to: by the at least one processor: set an overflow flag when the number of elements in the first buffer is greater than the first threshold; and reset the overflow flag when the second buffer is determined to be empty, wherein the determination that the second buffer is empty and the number of elements in the first buffer is less than the first threshold is by determining that the overflow flag is reset.

47. The tangible computer readable medium of any one of clause 39 to clause 46, wherein the first buffer is a ring buffer.

48. The tangible computer readable medium of any one of clause 39 to clause 47, wherein the second buffer is a queue for queuing elements for adding to the first buffer.

49. The tangible computer readable medium of any one of clause 39 to clause 48, wherein the instructions, when executed, cause the machine to: by the at least one processor: provide a number of worker threads that add to the first buffer, wherein the first threshold is at most the total number of elements for which the first buffer has capacity less the number of worker threads.

50. The tangible computer readable medium of any one of clause 39 to clause 49, wherein the elements are messages, and wherein the element is obtained by receiving a message from an external entity via a communications interface.

51. The tangible computer readable medium of any one of clause 39 to clause 49, wherein the element is obtained by removing an element from a third buffer.

52. The tangible computer readable medium of any one of clause 39 to clause 51, wherein the elements are each a reference to a queue of one or more messages.

53. The tangible computer readable medium of any one of clause 39 to clause 52, wherein the elements relate to messages, wherein the instructions, when executed, cause the machine to: implement a server system comprising the memory and the at least one processor; and, by the at least one processor, facilitate messaging between a host system and one or more client systems.

54. The tangible computer readable medium of clause 53, wherein one or more of the client systems include a trading device and the host system includes an electronic exchange.

55. The tangible computer readable medium of clause 53 or clause 54, wherein the wherein the instructions, when executed, cause the machine to: establish a plurality of connections between the host system and a respective plurality of client systems; provide, in the memory, a first buffer and an associated second buffer for each of the plurality of connections; and, for at least some of the connections, by the at least one processor: add elements to the respective first buffer or second buffer for that connection.

56. The tangible computer readable medium of any one of clause 53 to clause 55, wherein the messaging between the host system and the one or more client systems is bi-directional, wherein the instructions, when executed, cause the machine to: provide a first buffer and an associated second buffer for each of a first messaging direction and a second messaging direction; and, by the at least one processor, for each messaging direction, add elements to the respective first buffer or second buffer for that direction.

57. The tangible computer readable medium of any one of clause 53 to clause 56, wherein the wherein the instructions, when executed, cause the machine to: implement an order connector of an electronic trading platform, the order connector comprising the at least one processor and the memory.

The invention claimed is:

1. A system including:
   a memory configured to provide:
      a first buffer for storing a number of elements for processing; and
      a second buffer for storing elements for adding to the first buffer; and
   at least one processor configured to:
      obtain an element to be processed;
      determine that the number of elements in the first buffer is greater than a first threshold;
      implement a number of worker threads that add elements to the first buffer, wherein the first threshold is at most the total number of elements for which the first buffer has capacity less the number of worker threads; and
      add the obtained element to the second buffer.

2. The system of claim 1, wherein the at least one processor is further configured to:
   based at least in part on a determination that the number of elements in the first buffer is less than the first threshold, add the obtained element to the first buffer.

3. The system of claim 1, wherein the at least one processor is configured to:
   set an overflow flag when the number of elements in the first buffer is greater than the first threshold; and
   wherein the at least one processor is configured to determine that the number of elements in the first buffer is greater than the first threshold by determining that the overflow flag is set.

4. The system of claim 1, wherein the at least one processor is further configured to:
   determine that the number of elements in the first buffer is less than a second threshold, wherein the second threshold is lower than the first threshold; and
   remove an element from the second buffer and add the removed element to the first buffer.

5. The system of claim 1, wherein the first buffer is a first queue for queuing a number of elements for processing, and the second buffer is a second queue for queuing elements for adding to the first queue.

6. The system of claim 1, wherein the at least one processor is further configured to:
   determine that a number of elements in the second buffer is greater than zero; and
   add the obtained element to the second buffer.

7. The system of claim 1, wherein the at least one processor is further configured to:
   determine that the second buffer is empty and that the number of elements in the first buffer is less than the first threshold; and
   add the obtained element to the first buffer.

8. The system of claim 7, wherein the at least one processor is configured to:
   set an overflow flag when the number of elements in the first buffer is greater than the first threshold; and
   reset the overflow flag when the second buffer is determined to be empty,
   wherein the at least one processor is configured to determine that the second buffer is empty and the number of elements in the first buffer is less than the first threshold by determining that the overflow flag is reset.

9. The system of claim 1, wherein the first buffer is a ring buffer.

10. The system of claim 1, wherein the second buffer is a queue for queuing elements for adding to the first buffer.

11. The system of claim 1, wherein the elements are messages, and the at least one processor is configured to obtain the element by receiving a message from an external entity via a communications interface.

12. The system of claim 1, wherein the at least one processor is configured to obtain the element by removing an element from a third buffer.

13. The system of claim 1, wherein the elements are each a reference to a queue of one or more messages.

14. The system of claim 1, wherein the elements relate to messages, wherein the system includes a server system including the at least one processor and the memory, and the server system is configured to facilitate messaging between a host system and one or more client systems.

15. The system of claim 14, wherein one or more of the client systems include a trading device and the host system includes an electronic exchange.

16. The system of claim 14, wherein the server system is configured to establish a plurality of connections between the host system and a respective plurality of client systems, wherein the memory is configured to provide a first buffer and an associated second buffer for each of the plurality of connections, and wherein the at least one processor is configured to, for at least some of the connections, add elements to the respective first buffer or second buffer for that connection.

17. The system of claim 14, wherein the messaging between the host system and the one or more client systems is bi-directional, wherein the memory is configured to provide a first buffer and an associated second buffer for each of a first messaging direction and a second messaging direction, and wherein the at least one processor is configured to, for each messaging direction, add elements to the respective first buffer or second buffer for that direction.

18. The system of claim 14, wherein the server system includes an order connector of an electronic trading platform, and the order connector incudes the at least one processor and the memory.

* * * * *